United States Patent
Hansmann et al.

[11] Patent Number: 6,060,591
[45] Date of Patent: May 9, 2000

[54] WATER-SOLUBLE FIBER-REACTIVE DYES, PROCESSES FOR THEIR PREPARATION, AND THEIR USE

[75] Inventors: Wilfried Hansmann, Leverkusen; Hermann Henk, Köln; Stefan Ehrenberg, Frankfurt; Wolfram Reddig, Leverkusen, all of Germany

[73] Assignee: Dy Star Textilfarben GmbH & Co. Deutschland K.G., Frankfurt, Germany

[21] Appl. No.: 08/987,939

[22] Filed: Dec. 1, 1997

[30] Foreign Application Priority Data

Dec. 10, 1996 [DE] Germany .......... 196 51 213

[51] Int. Cl.$^7$ .............. C09B 62/20; D06P 1/382
[52] U.S. Cl. .......... 534/618; 534/624; 534/629; 534/634; 534/637; 534/638; 540/125; 544/76; 544/189; 544/294
[58] Field of Search .................. 534/618, 624, 534/629, 634, 637, 638; 540/125; 544/76, 189, 294

[56] References Cited

U.S. PATENT DOCUMENTS

| 4,007,164 | 2/1977 | Bien et al. ............ 534/638 X |
| 5,319,074 | 6/1994 | Reddig et al. ............ 534/618 |
| 5,340,928 | 8/1994 | Hoppe et al. ............ 534/618 |
| 5,420,255 | 5/1995 | Arnold et al. ............ 534/638 X |
| 5,436,324 | 7/1995 | Reddig et al. ............ 534/625 |
| 5,512,663 | 4/1996 | Kunde ............ 534/637 X |
| 5,538,518 | 7/1996 | Reddig et al. ............ 8/549 |
| 5,541,300 | 7/1996 | Bootz et al. ............ 534/605 |
| 5,760,193 | 6/1998 | Russ et al. ............ 534/634 X |

FOREIGN PATENT DOCUMENTS

| 497174 | 8/1992 | European Pat. Off. . |
| 526792 | 2/1993 | European Pat. Off. . |
| 542079 | 5/1993 | European Pat. Off. . |
| 622424 | 11/1994 | European Pat. Off. . |
| 627471 | 12/1994 | European Pat. Off. . |
| 774493 | 5/1997 | European Pat. Off. . |
| 1570565 | 5/1969 | France . |
| 1165661 | 10/1969 | United Kingdom . |

Primary Examiner—Fiona T. Powers

[57] ABSTRACT

The disclosed dyes (which are fiber-reactive and are useful for dyeing materials containing OH and/or carboxamide groups) are compounds of the formula (1)

$$Fb-Z_n \qquad (1)$$

in which:

Fb is the radical of various classes of dyestuffs, including the formazans, azomethines, phthalocyanines, etc., and particularly sulfo group-containing monoazo or disazo dyes of the formulas (a-1) through (a-5):

$$D^1-N=N-K^2- \qquad (a\text{-}1)$$

$$-D^2-N=N-(E-N=N)_v-K^1 \qquad (a\text{-}2)$$

$$-D^2-N=N-(E-N=N)_v-K^2- \qquad (a\text{-}3)$$

$$D^1-N=N-K^0-N=N-D^2- \qquad (a\text{-}4)$$

$$-D^1-N=N-K^0-N=N-D^2- \qquad (a\text{-}5)$$

in which in which $D^1$ is a substituted or unsubstituted phenyl or naphthyl radical, $D^2$ is the radical of a diazo component and $K^1$, $K^2$, and $K^0$ are various coupling components, and E is a middle component.

16 Claims, No Drawings

WATER-SOLUBLE FIBER-REACTIVE DYES, PROCESSES FOR THEIR PREPARATION, AND THEIR USE

The invention is in the technical field of fiber-reactive dyes.

The practise of dyeing with fiber-reactive dyes additionally leads to increased demands on the quality of the dyeings and the economy of the dyeing process, which is why novel fiber-reactive dyes are required which have improved properties, not only good fastnesses, but also a high degree of fixing to the material to be dyed. Thus in German Offenlegungsschrift No. 4 122 100 and U.S. Pat. Nos. 5,319,074, 5,340,928, 5,436,324 and 5,538,518, fiber-reactive dyes are disclosed which contain a 2,4-difluoropyrimidin-6-yl radical as a fiber-reactive component. Because of the increased demands addressed, these known dyes are worthy of improvement, in particular with respect to their degree of fixing and the color intensity of the dyeings and prints obtainable using them.

With the present invention, novel fiber-reactive dyes having a 5,6-difluoropyrimidin-4-yl radical as a fiber-reactive group have been found, which correspond to the formula (1)

$$Fb—Z_n \quad (1)$$

defined below and differ advantageously from the known dyes and yield dyeings and prints having high color intensity.

In the formula (1):

Fb is the radical of a sulfo group-containing mono-, dis- or polyazo dye, such as a trisazo dye, or heavy metal complex mono-, dis- or trisazo dye or anthraquinone, azomethine, phenazine, stilbene, triphenylmethane, xanthene, thioxanthene, nitroaryl, naphthoquinone, pyrenequinone, perylenetetracarbimide, formazan, copper formazan, phthalocyanine, copper phthalocyanine, nickel phthalocyanine, cobalt phthalocyanine, aluminum phthalocyanine or triphendioxazine dye;

n is the number 1, 2 or 3, preferably 1 or 2, particularly preferably 1;

Z is a group of the formula (2)

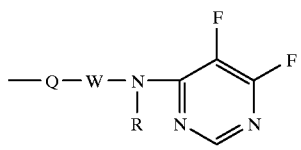

(2)

in which

Q is a covalent bond or a group of the formula

preferably a group of the formula —N($R^A$)— or a covalent bond, in which $R^A$ is hydrogen or alkyl of 1 to 4 carbon atoms, such as methyl and ethyl, optionally substituted by halogen, such as chlorine and bromine, hydroxy, cyano, alkoxy of 1 to 4 carbon atoms, such as methoxy and ethoxy, alkoxycarbonyl of 2 to 5 carbon atoms, such as carbethoxy and carbomethoxy, carboxy, sulfamoyl, sulfo, sulfato or phosphato, and is preferably methyl or ethyl and particularly preferably hydrogen, W is a covalent bond or a bridging member, such as, for example, a straight-chain or branched alkylene radical of 1 to 6 carbon atoms or an alkylene radical of 2 to 8 carbon atoms, which is interrupted by 1 or 2 hetero groups from the group consisting of —NH—, —N($R^A$)— with $R^A$ having the abovementioned meaning, —SO$_2$—, —CO—, —O—, —NH—SO$_2$—, —SO$_2$—NH—, —CO—NH— and —NH—CO—, or an optionally substituted arylene radical or an optionally substituted arylene-alkylene radical or, for example, a radical containing two arylene radicals which are bonded to one another via a covalent bond, a hetero group, such as —NH— or —O—, or an alkylene radical of 1 to 4 carbon atoms or an olefinic radical of 2 to 4 carbon atoms, or, for example, the bivalent radical of a heterocycle, such as a triazine, to which the bivalent radical of an optionally substituted phenylene-amino, naphthylene-amino, phenylene-methylamino or ($C_1$–$C_6$)-alkylene-amino radical can be bonded, but where Q is compulsorily a covalent bond if W is a covalent bond, and where the amino groups —N($R^A$)— and —N(R)— are bonded to one carbon atom of the bridging member W or to one carbon atom of a substituent of W, and R is hydrogen or alkyl of 1 to 4 carbon atoms, such as methyl or ethyl, optionally substituted by halogen, such as chlorine and bromine, hydroxy, cyano, alkoxy of 1 to 4 carbon atoms, such as methoxy and ethoxy, alkoxycarbonyl of 2 to 5 carbon atoms, such as carbomethoxy and carbethoxy, carboxy, sulfamoyl, sulfo, sulfato or phosphato, preferably methyl or ethyl and particularly preferably hydrogen.

Arylene radicals are preferably phenylene radicals which are optionally substituted, such as, for example, by one or two substituents from the group consisting of sulfo, carboxy, alkyl of 1 to 4 carbon atoms, such as ethyl and in particular methyl, alkoxy of 1 to 4 carbon atoms, such as ethoxy and in particular methoxy, chlorine, hydroxy and alkanoylamino of 2 to 4 carbon atoms, such as propionylamino and acetylamino, and naphthylene radicals are optionally substituted, for example, by 1, 2 or 3 sulfo groups or by 1 or 2 carboxy groups or by alkyl of 1 to 4 carbon atoms, such as ethyl and methyl, or alkoxy of 1 to 4 carbon atoms, such as ethoxy and methoxy, or by two or three substituents from the group consisting of alkyl of 1 to 4 carbon atoms, such as ethyl and methyl, alkoxy of 1 to 4 carbon atoms, such as ethoxy and methoxy, sulfo and carboxy.

Alkylene radicals are preferably those of 1 to 4 carbon atoms.

Fb is preferably the radical of a mono- or disazo dye or the radical of a heavy metal complex azo dye, such as a 1:2 chromium complex, 1:2 cobalt complex and in particular of a o,o'-1:1 copper complex monoazo or disazo dye, or the radical of an anthraquinone or copper formazan or of a nickel, copper or aluminum phthalocyanine dye or of a triphendioxazine dye.

The dye radical Fb has one or more, such as 2 to 6, sulfo groups. The radical Fb can contain further substituents which are customary in organic dyes. Such substituents are, for example: alkyl groups of 1 to 4 carbon atoms, such as methyl, ethyl, propyl, isopropyl or butyl, of these preferably ethyl and in particular methyl; alkoxy groups of 1 to 4 carbon atoms, such as methoxy, ethoxy, propoxy, isopropoxy and butoxy, of these preferably ethoxy and in particular methoxy; alkanoylamino groups of 2 to 5 carbon atoms, such as the acetylamino and propionylamino groups; benzoylamino groups optionally substituted by sulfo, carboxy, methyl, ethyl, methoxy, ethoxy and/or chlorine; primary and mono- or disubstituted amino groups, where the substituents are, for example, alkyl groups of 1 to 4 carbon atoms and/or phenyl groups, such as monoalkylamino and dialkylamino groups having 1 to 4 carbon atoms in the alkyl radical, phenylamino or N—($C_1$–$C_4$-alkyl)-N-phenylamino groups, where the alkyl radicals can also be substituted, for example by phenyl, sulfophenyl, hydroxy, sulfato, sulfo and carboxy, and the phenyl groups can also be substituted, such as by chlorine, sulfo, carboxy, methyl and/or methoxy, i.e., for example, methylamino, ethylamino, propylamino, isopropylamino, butylamino, N,N-di-(β-hydroxyethyl) amino, N,N-di-(β-sulfatoethyl)amino, sulfobenzylamino, N,N-di-(sulfobenzyl)amino and diethylamino groups and also phenylamino and sulfophenylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms, such as fluorine, chlorine and bromine; carbamoyl groups which can be mono- or disubstituted by alkyl of 1 to 4 carbon atoms, where the alkyl radicals can in turn be substituted, for example by hydroxy, sulfato, sulfo, carboxy, phenyl and sulfophenyl, such as, for example, N-methylcarbamoyl and N-ethylcarbamoyl; sulfamoyl groups which can be mono- or disubstituted by alkyl groups of 1 to 4 carbon atoms, and N-phenyl-N-alkylsulfamoyl groups having an alkyl group of 1 to 4 carbon atoms, where these alkyl groups in turn can be substituted by hydroxy, sulfato, sulfo, carboxy, phenyl and sulfophenyl, such as, for example N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di-(β-hydroxyethyl)sulfamoyl; N-phenylsulfamoyl, ureido, hydroxy, carboxy, sulfomethyl and sulfo groups. The dye radical Fb can furthermore have one or two fiber-reactive groups of the formula Y—$SO_2$—$W^O$—, in which $W^O$ is an alkylene radical of 1 to 4 carbon atoms or an amino group of the formula —N($CH_3$)— or —N($C_2H_5$)— or a group of the formula —($C_2$–$C_4$-alkylene)—NH— or a direct covalent bond and Y is vinyl or is β-sulfatoethyl, β-thiosulfatoethyl, β-phosphatoethyl, β-($C_2$–$C_5$-alkanoyloxy)ethyl, such as β-acetyloxyethyl, β-benzoyloxyethyl, β-(sulfobenzoyloxy) ethyl, β-(p-toluenesulfonyloxy)ethyl or β-haloethyl, such as β-bromoethyl or β-chloroethyl, and is preferably vinyl and particularly preferably β-chloroethyl or β-sulfatoethyl.

Bridge members W are in particular 1,2-ethylene, 1,3-propylene, 1,4-butylene, 1,2-propylene, 1,3-butylene, straight-chain alkylene of 2 to 6 carbon atoms and branched alkylene of 3 to 6 carbon atoms, each of which is interrupted by 1 or 2 hetero groups, which are selected from the groups of the formulae —O—, —CO—, —$SO_2$—, —NH—, —N($R^A$)— with $R^A$ having one of the abovementioned meanings, —NH—CO—, —CO—NH—, —$SO_2$—NH— or —NH—$SO_2$—, phenylene which can be substituted by 1 or 2 substituents from the group consisting of sulfo, carboxy, methyl, ethyl, methoxy and ethoxy, such as, for example, phen-1,3-ylene, phen-1,4-ylene, 6-sulfophen-1,3-ylene, 6-sulfophen-1,4-ylene, 3,6-disulfophen-1,4-ylene, 6-methoxyphen-1,3-ylene or benzylidene which can be substituted by 1 or 2 substituents from the group consisting of sulfo, carboxy, methyl, ethyl, methoxy and ethoxy, such as, for example 1,4-benzylidene, 1,3-benzylidene, 2-sulfophen-1-yl-4-methylene, 2-sulfophen-1-ylene-5-methylene and 2-methoxyphen-1-yl-4-methylene, in addition the radical of 1,1-diphen-4,4'-ylene, which can be substituted in each phenylene radical by methyl, methoxy or sulfo, or is the 1,1'-stilben-4,4'-ylene radical, which can be substituted in each phenylene radical by methyl, methoxy or sulfo, furthermore a radical of the formula (a)

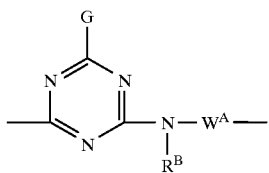

(a)

in which

G is fluorine, chlorine, bromine, cyanoamino, optionally substituted amino, hydroxy, alkoxy of 1 to 4 carbon atoms, such as methoxy and ethoxy, phenoxy optionally substituted by 1 or 2 substituents from the group consisting of sulfo, carboxy, methyl, ethyl, methoxy and ethoxy, or alkylthio of 1 to 4 carbon atoms, such as methylthio and ethylthio, but preferably chlorine or fluorine, $R^B$ is hydrogen or alkyl of 1 to 4 carbon atoms, such as methyl and ethyl, optionally substituted by halogen, such as chlorine and bromine, hydroxy, cyano, alkoxy of 1 to 4 carbon atoms, such as methoxy and ethoxy, alkoxycarbonyl of 2 to 5 carbon atoms, such as carbethoxy and carbomethoxy, carboxy, sulfamoyl, sulfo, sulfato or phosphate, and is preferably methyl or ethyl and particularly preferably hydrogen, and $W^A$ is straight-chain alkylene of 2 to 6 carbon atoms or branched alkylene of 3 to 6 carbon atoms, each of which can be interrupted by one or two hetero groups which are selected from the groups of the formulae —O—, —CO—, —$SO_2$—, —NH—, —N($R^A$)— with $R^A$ having one of the abovementioned meanings, —NH—CO—, —CO—NH—, —$SO_2$—NH— or —NH—$SO_2$—, or is phenylene optionally substituted by 1 or 2 substituents from the group consisting of sulfo, carboxy, methyl, ethyl, methoxy and ethoxy, such as, for example, phen-1,3-ylene, phen-1,4-ylene, 6-sulfophen-1,3-ylene, 6-sulfophen-1,4-ylene, 3,6-disulfophen-1,4-ylene, 6-methoxyphen-1,3-ylene or benzylidene optionally substituted by 1 or 2 substituents from the group consisting of sulfo, carboxy, methyl, ethyl, methoxy and ethoxy, such as, for example, 1,4-benzylidene, 1,3-benzylidene, 2-sulfophen-1-yl-4-methylene, 2-sulfophen-1-yl-5-methylene or 2-methoxyphen-1-yl-4-methylene.

In the above and in the following formulae, the individual formula members, of both a different and also the same description within the formula, can have meanings which are identical to one another or different from one another in their scope.

The groups "sulfo", "thiosulfato", "carboxy", "phosphate" and "sulfato" include both their acid form and their salt form. Accordingly, sulfo groups are groups corresponding to the formula —$SO_3M$, thiosulfato groups are groups corresponding to the formula —S—$SO_3M$, carboxy groups are groups corresponding to the formula —COOM, phosphate groups are groups corresponding to the formula —$OPO_3M_2$ and sulfato groups are groups corresponding to the formula —$OSO_3M$, in which M is hydrogen or an alkali metal, such as sodium, potassium or lithium, or the molar equivalent of an alkaline earth metal, such as of calcium, and preferably hydrogen or an alkali metal.

Important azo dyes corresponding to the formula (1) are those in which Fb is the radical of a sulfo group-containing dye of the benzeneazonaphthol, the benzeneazo-1-phenyl-5-pyrazolone, the benzeneazobenzene, the naphthaleneazobenzene, the benzeneazoaminonaphthalene, the naphthaleneazonaphthalene, the naphthaleneazo-1-phenyl-5-pyrazolone, the benzeneazopyridone and the naphthaleneazopyridone series. Of the 1:1 copper complex azo dyes according to the invention, those of the benzene and naphthalene series are preferred.

Preferred mono- and disazo dyes of the formula (1) are, for example, those of the formulae (3a), (3b), (3c) and (3d)

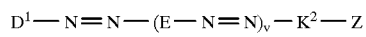 (3a)

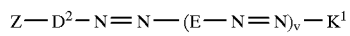 (3b)

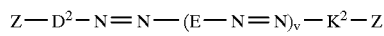 (3c)

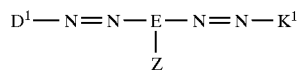 (3d)

and the heavy metal complex compounds derived therefrom, such as 1:1-copper complex compounds, in which $D^1$ is the radical of a diazo component of the benzene or naphthalene series, $D^2$ is the radical of a diazo component of the diaminobenzene or diaminonaphthalene series, E is the radical of a middle component of the benzene or naphthalene series, $K^1$ is the radical of a coupling component of the benzene, naphthalene, pyrazolone, 6-hydroxypyrid-2-one or acetoacetic acid arylamide series, $K^2$ is the bivalent radical of a coupling component of the aniline, aminonaphthalene, acetic acid (aminoaryl)amide or 1-aminophenylpyrazolone series, where $D^1$, $D^2$, E, $K^1$ and $K^2$ can contain one or more of the substituents mentioned for Fb and the radicals $D^1$, $D^2$, E, $K^1$ and $K^2$ together have at least one, preferably at least two, sulfo groups, v is the number zero or 1 and Z is a group of the formula (2) of the above meaning.

Preferred disazo dyes are furthermore those of the formulae (3e) and (3f)

 (3e)

 (3f)

in which Z, $D^1$ and $D^2$ have the abovementioned meanings and $K^o$ is the radical of a bivalent coupling component of the naphthalene series, where $D^1$, $D^2$ and $K^o$ can contain the substituents mentioned for Fb and $D^1$, $D^2$ and $K^o$ together contain at least one sulfo group.

Azo dyes of the formulae (3d) and (3e) are particularly dyes of the formula (3g)

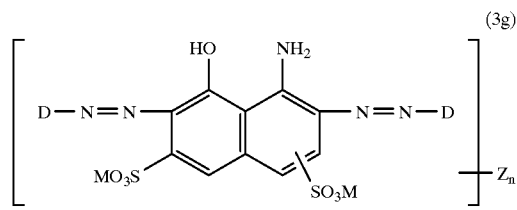 (3g)

in which n has the abovementioned meaning,

M is hydrogen or alkali metal, such as sodium, potassium or lithium, or the molar equivalent of an alkaline earth metal, such as of calcium, Z is a radical of the formula (2), which if n is 1 is on one of the radicals D and if n is 2 is bonded to both Ds, and D each has the meaning of $D^1$ or $D^2$, depending on whether the radical Z is bonded to D.

Of the 1:1 copper complex azo dyes, for example, those of the formula (3h) and (3i)

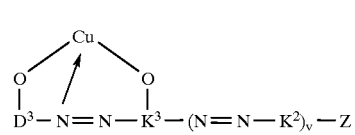 (3h)

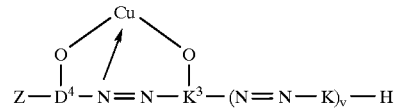 (3i)

are to be emphasized, in which

Z, $K^2$ and v have the abovementioned meanings, $D^4$ is the radical of a diazo component which in the ortho-position relative to the azo group contains the copper complex-binding oxy group, and $K^3$ is the radical of a coupling component which in the ortho-position or vicinal position relative to the azo group has the copper complex-binding oxy group, and K is the bivalent radical of a coupling component.

Aromatic radicals of diazo components which bear no fiber-reactive group of the formula (2), such as of those which correspond to the formulae $D^1$—$NH_2$ and $D^3$—$NH_2$, are, for example, those of the formulae (4a), (4b), (5a) and (5b)

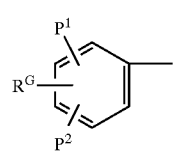 (4a)

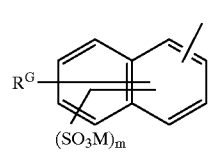 (4b)

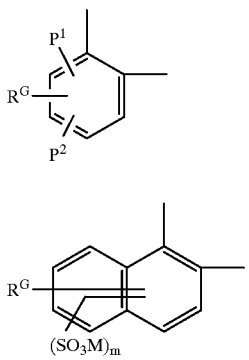

in which

R$^G$ is hydrogen, sulfo or a group of the formula Y—SO$_2$—W$^o$— with W$^o$ and Y having the above meaning, P$^1$ is hydrogen, methyl, ethyl, methoxy, ethoxy, alkanoyl of 2 to 5 carbon atoms, such as acetyl and propionyl, cyano, sulfo, carboxy, alkoxycarbonyl of 2 to 5 carbon atoms, such as methoxycarbonyl and ethoxycarbonyl, carbamoyl, N—(C$_1$–C$_4$-alkyl)carbamoyl, fluorine, chlorine, bromine or trifluoromethyl, P$^2$ is hydrogen, methyl, ethyl, methoxy, ethoxy, cyano, nitro, carboxy, sulfo, chlorine, alkanoylamino of 2 to 5 carbon atoms, such as acetylamino, alkoxycarbonyl of 2 to 5 carbon atoms, such as methoxycarbonyl and ethoxycarbonyl, carbamoyl, N—(C$_1$–C$_4$-alkyl)sulfamoyl, sulfophenylamidocarbonyl, phenylamidocarbonyl, alkylsulfonyl of 1 to 4 carbon atoms, phenylsulfonyl or phenoxy, where the benzene nucleus in formulae (4a) and (4b) can additionally contain a hydroxy group in the ortho-position relative to the free bond which leads to the azo group, m is the number zero, 1 or 2 (where if m is zero this group is a hydrogen atom) and M has the abovementioned meaning.

Of these, P$^1$ is preferably hydrogen, methyl, methoxy, bromine, chlorine, sulfo and carboxy, and P$^2$ is hydrogen, methyl, methoxy, chlorine, carboxy, sulfo and acetylamino.

Groups of the formulae (4a) and (4b) are, for example: phenyl, 2-methylphenyl, 3- and 4-methylphenyl, 2-methoxyphenyl, 3- and 4-methoxyphenyl, 2-chlorophenyl, 3- and 4-chlorophenyl, 2,5-dichlorophenyl, 2,5-dimethylphenyl, 2-methoxy-5-methylphenyl, 2-methoxy-4-nitrophenyl, 4-phenylphen-1-yl, 3-phenoxyphenyl, 2-sulfamoylphenyl, 3- and 4-sulfamoylphenyl, 2-, 3- and 4-(N-methylsulfamoyl), -(N-ethylsulfamoyl), -(N,N-dimethylsulfamoyl) and -(N,N-diethylsulfamoyl)phenyl, 2-sulfo-5-trifluoromethylphenyl, 2-nitrophenyl, 3- and 4-nitrophenyl, 3-acetylaminophenyl, 4-acetylaminophenyl, 2-carboxyphenyl, 4-carboxyphenyl, 3-carboxyphenyl, 3-chloro-6-carboxyphenyl, 2-sulfophenyl, 3-sulfophenyl, 4-sulfophenyl, 2,5-disulfophenyl, 2,4-disulfophenyl, 3,5-disulfophenyl, 2-methyl-5-sulfophenyl, 2-methoxy-5-sulfophenyl, 2-methoxy-4-sulfophenyl, 2-sulfo-5-methylphenyl, 2-methyl-4-sulfophenyl, 3-sulfo-4-methoxy-phenyl, 5-sulfo-2-ethoxyphenyl, 4-sulfo-2-ethoxyphenyl, 2-carboxy-5-sulfophenyl, 2-carboxy-4-sulfophenyl, 2,5-dimethoxy-4-sulfophenyl, 2,4-dimethoxy-5-sulfophenyl, 2-methoxy-5-methyl-4-sulfophenyl, 2-sulfo-4-methoxyphenyl, 2-sulfo-4-methylphenyl, 2-methyl-4-sulfo-phenyl, 2-chloro-4-sulfophenyl, 2-chloro-5-sulfophenyl, 2-bromo-4-sulfophenyl, 2,6-dichloro-4-sulfophenyl, 2-sulfo-4- and -5-chlorophenyl, 2-sulfo-4,5-dichlorophenyl, 2,5-dichloro-6-sulfophenyl, 2,5-dichloro-4-sulfophenyl, 2-sulfo-5-chloro-4-methylphenyl, 2-sulfo-4-chloro-5-methylphenyl, 2-sulfo-5-methoxyphenyl, 2-methoxy-5-sulfophenyl, 2-methoxy-4-sulfophenyl, 2,4-dimethoxy-6-sulfophenyl, 2-sulfo-5-acetylamino-4-methylphenyl, 2-methyl-4,6-disulfophenyl, 2,5-disulfo-4-methoxyphenyl, 2-sulfo-5-nitrophenyl, 2-sulfo-4-nitrophenyl, 2,6-dimethyl-3-sulfophenyl, 2,6-dimethyl-4-sulfophenyl, 3-acetylamino-6-sulfophenyl, 4-acetylamino-2-sulfophenyl, 4-sulfonaphth-1-yl, 3-sulfonaphth-1-yl, 5-sulfonaphth-1-yl, 6-sulfonaphth-1-yl, 7-sulfonaphth-1-yl, 8-sulfonaphth-1-yl, 3,6-disulfo- and 5,7-disulfonaphth-1-yl, 3,7-disulfonaphth-1-yl, 3,6,8-trisulfonaphth-1-yl, 4,6,8-trisulfonaphth-1-yl, 5-sulfonaphth-2-yl, 6- or 8-sulfonaphth-2-yl, 3,6,8-trisulfonaphth-2-yl, 1,5,7-trisulfonaphth-2-yl, 1,7-disulfonaphth-2-yl, 5,7-disulfonaphth-2-yl, 2,5,7-trisulfonaphth-1-yl, 4,6,8-trisulfonaphth-2-yl, 6,8-disulfonaphth-2-yl, 1,6-disulfonaphth-2-yl, 1-sulfonaphth-2-yl, 1,5-disulfonaphth-2-yl, 3,6-disulfonaphth-2-yl, 4,8-disulfonaphth-2-yl, 2-hydroxy-5-sulfophenyl, 2-hydroxy-4-sulfophenyl, 2-hydroxy-3,5-disulfophenyl, 2-hydroxy-5-acetylamino-3-sulfophenyl, 2-hydroxy-3-acetylamino-4-sulfophenyl, 2-hydroxy-5-chloro-4-sulfophenyl, 2-hydroxy-5-methylsulfonylphenyl, 2-hydroxy6-nitro-4-sulfonaphth-1-yl and 1-hydroxy-4,8-disulfonaphth-2-yl, 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro4-(β-sulfatoethylsulfonyl)phenyl, 2-bromo-4-(β-sulfatoethylsulfonyl)phenyl, 4-methoxy-3-(β-sulfatoethylsulfonyl)phenyl, 4-chloro-3-(β-sulfatoethylsulfonyl)phenyl, 2-ethoxy-4- or -5-(β-sulfatoethylsulfonyl)phenyl, 2-methyl-4-(β-sulfatoethylsulfonyl)phenyl, 2-methoxy-5- or 4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2-, 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-5-(β-sulfatoethylsulfonyl)phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfatoethylsulfonyl)naphth-2-yl, 6- or 7- or 8-(β-sulfatoethylsulfonyl)naphth-2-yl, 6-(β-sulfatoethylsulfonyl)-1-sulfonaphth-2-yl, 5-(β-sulfatoethylsulfonyl)-1-sulfonaphth-2-yl, 8-(β-sulfatoethylsulfonyl)-6-sulfonaphth-2-yl, 4-[N-methyl-N-(β-sulfatoethylsulfonyl)]aminophenyl, 3-[N-methyl-N-(β-sulfatoethylsulfonyl)]aminophenyl, 4-[β-(β'-sulfatoethylsulfonyl)ethyl]phenyl, 3- or 4-[β-(β'-chloroethylsulfonyl)ethylamino]phenyl, 3- or 4-[β-(β'-sulfatoethylsulfonyl)ethylamino]phenyl, 3- or 4-[γ-(β'-chloroethylsulfonyl)propylamino]phenyl, 3- or 4-[γ-(β'-sulfatoethylsulfonyl)propylamino]phenyl, 3- or 4-[γ-(vinylsulfonyl)propylamino]phenyl, 4-[β-(β'-sulfatoethylsulfonyl)ethylamino]-2- or -3-sulfophenyl, 4-[β-(β'-chloroethylsulfonyl)ethylamino]-2- or -3-sulfophenyl, 4-[γ-(β'-sulfatoethylsulfonyl)propylamino]-2- or -3-sulfophenyl, 4-[γ-(β'-chloroethylsulfonyl)propylamino]-2- or -3-sulfophenyl, 4-[β-(β'-chloroethylsulfonyl)

ethylamino]-2-carboxyphenyl, 4-[β-(β'-sulfatoethylsulfonyl)ethylamino]-2-carboxyphenyl, 4-[γ-(β'-chloroethylsulfonyl)propylamino]-2-carboxyphenyl and 4-[γ-(β'-sulfatoethylsulfonyl)propylamino]-2-carboxyphenyl.

Groups corresponding to the formula radicals D—N=N—E— and $D^1$—N=N—E— are, for example, 4-(4'-sulfophenyl)azo-2-sulfophenyl, 4-(2',4'-disulfophenyl)azo-2-methoxy-5-methylphenyl, 4-(2',5'-disulfophenyl)azo-2-methyl-5-methoxyphenyl, 4-(3',6',8'-trisulfonaphth-2'-yl)-azo-3-ureidophenyl, 4-(4',8'-disulfonaphth-2'-yl)azo-3-acetylaminophenyl, 7-(1',5'-disulfonaphth-2'-yl)azo-6-sulfo-8-hydroxynaphth-3-yl and 4-(4'-sulfophenyl)azo-6-sulfonaphth-1-yl, 4-[4'-(β-sulfatoethylsulfonyl)phenyl]azo-2-methyl-5-methoxyphenyl, 4-[3'-(β'-sulfatoethylsulfonyl)phenyl]azo-3-methylphenyl, 4-[4'-(β-sulfatoethylsulfonyl)phenyl]azo-3-ureidophenyl, 4-[6'-(β-sulfatoethylsulfonyl)naphth-2'-yl]azo-3-ureidophenyl, 7-[2'-methoxy-5'-(β-sulfatoethylsulfonyl)phenyl]azo-8-hydroxy-6-sulfonaphth-3-yl, 4-(2',5'-disulfophenyl)azo-6- or -7-sulfonaphth-1-yl, 4-(2',4'-disulfophenyl)azo-6- or -7-sulfonaphth-1-yl, 4-(4',8'-disulfonaphth-2'-yl)azo-6- or -7-sulfonaphth-1-yl, 4-(3',6',8'-trisulfonaphth-2'-yl)azo-6- or -7-sulfonaphth-1-yl and 4-(4',6',8'-trisulfonaphth-2'-yl)azo-6- or -7-sulfonaphth-1-yl.

Aromatic radicals Z—$D^2$— of compounds of the formula Z—$D^2$—$NH_2$ serving as diazo components or of their diaminobenzene and diaminonaphthalene compounds corresponding to the formula $H_2N$—$D^2$—$NH_2$ are preferably radicals of the formulae (6a) and (6b)

(6a)

(6b)

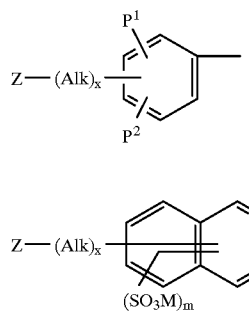

in which Z, M, m, $P^1$ and $P^2$ have the particularly preferred meanings indicated above, Alk is alkylene of 1 to 3 C-atoms, preferably methylene, and x is the number zero or 1, where the respective benzene nucleus in the ortho position relative to the free bond which leads to the azo group can additionally contain a hydroxy group. Aromatic radicals E of a couplable and diazotizable compound of the formula H—E—$NH_2$ are, for example, those of the formulae (7a), (7b) and (7c)

(7a)

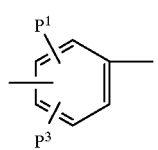

(7b)

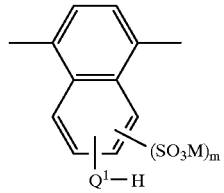

(7c)

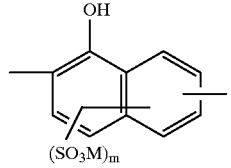

in which
$P^1$, M and m have the meanings indicated above,
$Q^1$ is a group of the formula —Q—W—N(R)— with Q, W and R having the abovementioned particularly preferred meanings, and
$P^3$ is hydrogen, alkyl of 1 to 4 carbon atoms, such as methyl or ethyl, alkoxy of 1 to 4 carbon atoms, such as methoxy and ethoxy, chlorine, alkanoylamino of 2 to 5 carbon atoms, such as acetylamino and propionylamino, benzoylamino, ureido, phenylureido, alkylureido having 1 to 4 carbon atoms in the alkyl radical, phenylsulfonyl or alkylsulfonyl of 1 to 4 carbon atoms or a radical of the formula —$Q^1$—H with $Q^1$ having the meaning indicated above, of these preferably the group —NH—.

Radicals $K^1$ of coupling components of the formula H—$K^1$, which bear no fiber-reactive group of the formula (2), are, for example, those of the formulae (8a) to (8h)

(8a)

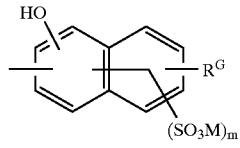

(8b)

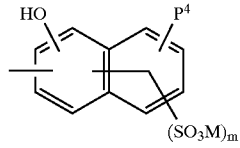

(8c)

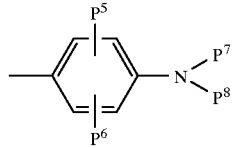

(8d)

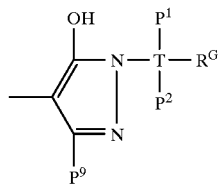

-continued

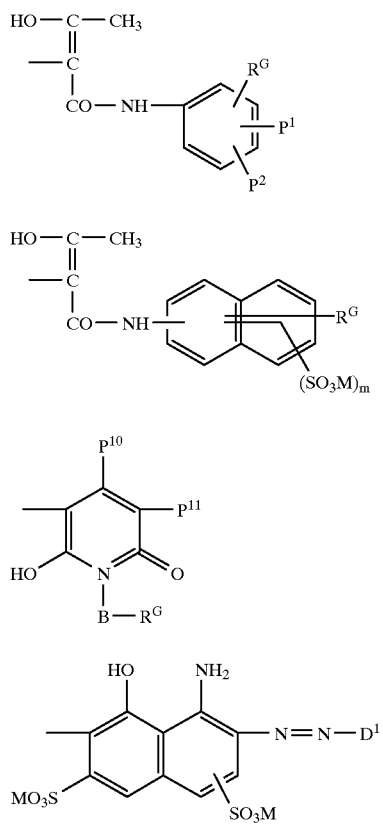

in which

R$^G$, P$^1$, P$^2$, m and M have the abovementioned meanings,

P$^4$ is alkanoylamino of 2 to 5 carbon atoms, such as propionylamino and in particular acetylamino, or phenylureido optionally substituted in the phenyl radical by substituents from the group consisting of chlorine, methyl, methoxy, sulfo and carboxy and/or by a group —SO$_2$—Y with Y having one of the above meanings, or is benzoylamino optionally substituted in the phenyl radical by substituents from the group consisting of chlorine, methyl, methoxy, nitro, sulfo and carboxy and/or by a group —SO$_2$—Y with Y having one of the above meanings, P$^5$ is hydrogen, alkyl of 1 to 4 carbon atoms, such as methyl and ethyl, alkoxy of 1 to 4 carbon atoms, such as methoxy and ethoxy, bromine, chlorine or sulfo, P$^6$ is hydrogen, alkyl of 1 to 4 carbon atoms, such as methyl and ethyl, alkoxy of 1 to 4 carbon atoms, such as methoxy and ethoxy, chlorine, alkanoylamino of 2 to 7 carbon atoms, such as acetylamino and propionylamino, ureido or phenylureido, P$^7$ is hydrogen or alkyl of 1 to 4 carbon atoms optionally substituted by hydroxy, cyano, carboxy, sulfo, sulfato, methoxycarbonyl, ethoxycarbonyl or acetoxy, P$^8$ is alkyl of 1 to 4 carbon atoms optionally substituted by hydroxy, cyano, carboxy, sulfo, sulfato, methoxycarbonyl, ethoxycarbonyl or acetoxy, or is benzyl or phenyl or phenyl substituted by alkyl of 1 to 4 carbon atoms, alkoxy of 1 to 4 carbon atoms, chlorine and/or sulfo, P$^9$ is hydrogen, alkyl of 1 to 4 carbon atoms, such as methyl, cyano, carboxy, carbalkoxy of 2 to 5 carbon atoms, such as carbomethoxy and carbethoxy, carbamoyl or phenyl, preferably methyl, carboxy, methoxycarbonyl, ethoxycarbonyl or phenyl and in particular methyl or carboxy, T is a benzene or naphthalene ring, preferably a benzene ring, P$^{10}$ is hydrogen or alkyl of 1 to 4 carbon atoms, such as methyl, or alkyl of 1 to 4 carbon atoms substituted by alkoxy of 1 to 4 carbon atoms, such as methoxy, or by cyano, or is phenyl, preferably alkyl of 1 to 4 carbon atoms or phenyl, P$^{11}$ is hydrogen, chlorine, bromine, sulfo, carbamoyl, methylsulfonyl, phenylsulfonyl, cyano or sulfoalkyl of 1 to 4 carbon atoms, preferably hydrogen, sulfo, sulfoalkyl having an alkyl radical of 1 to 4 carbon atoms, such as sulfomethyl, cyano or carbamoyl, B is alkylene of 1 to 4 carbon atoms, methylenephenylene, ethylenephenylene, phenylenemethylene, phenyleneethylene or phenylene or methylenephenylene, ethylenephenylene or phenylene substituted in the benzene radical by fluorine, chlorine, bromine, methyl, methoxy, cyano, sulfo, carboxy, acetyl, nitro, carbamoyl and/or sulfamoyl and D$^1$ is a radical of the formula (4a) or (4b).

Radicals —K$^2$—Z of coupling components of the formula H—K$^2$—Z, or their starting amino compounds H—K$^2$—N(R$^A$)H or H—K$^2$—Q—W—N(R)H (Z being here —N(R$^A$)H or —N(R)H) into which the fiber-reactive radical of the formula (2a)

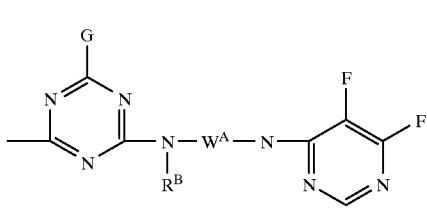

(with G, R$^B$, W$^A$ and R having the abovementioned meaning) or the 5,6-difluoropyrimidin-4-yl radical has to be introduced subsequently, are, for example, radicals of the formulae (9a) to (9h)

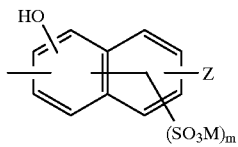

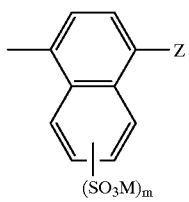

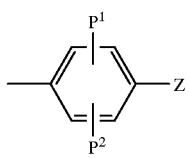

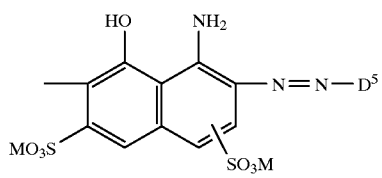
(9d)

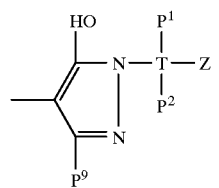
(9e)

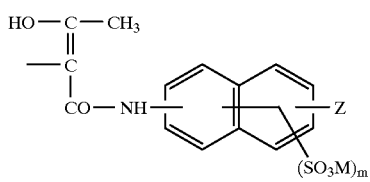
(9f)

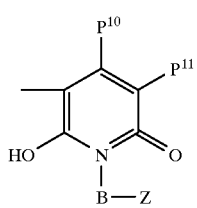
(9g)

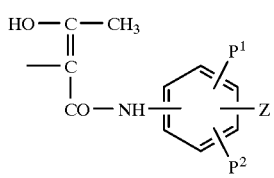
(9h)

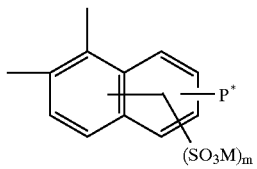
(10a)

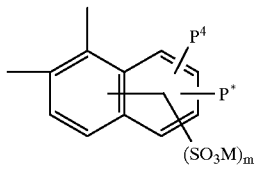
(10b)

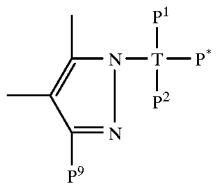
(10c)

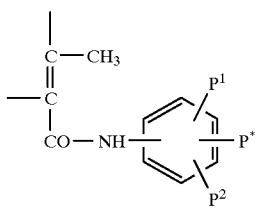
(10d)

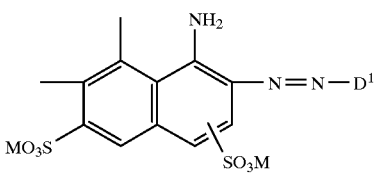
(10e)

in which $P^1$, $P^2$, $P^9$, $P^{10}$, $P^{11}$, B, T, M, m and Z have the particularly preferred meanings indicated above, and $D^5$ as a radical of a diazo component is a radical of the abovementioned and defined formula (6a) or (6b).

In the above formulae (8a), (8b) and (9a), the free bond which leads to the azo group is bonded to the aromatic nucleus in the ortho position relative to the hydroxy group.

Radicals $K^3$ in the formulae (3h) and (3i) having a metal complex-binding oxygen atom are in particular those of the formulae (10a) to (10e)

in which the individual formula members have one of the abovementioned meanings and P* is hydrogen or a radical Z or a group of the formula —N=N—$K^2$—Z or —N=N—K—H with $K^2$, Z and K having the abovementioned meaning.

Of the azo dyes, those are furthermore preferred which correspond to the formulae (11A) to (11Z), (11AA) and (11AB)

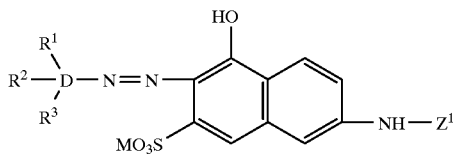
(11A)
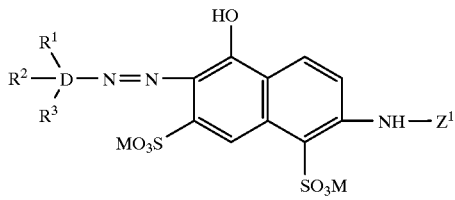
(11B)
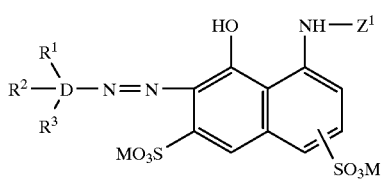
(11C)
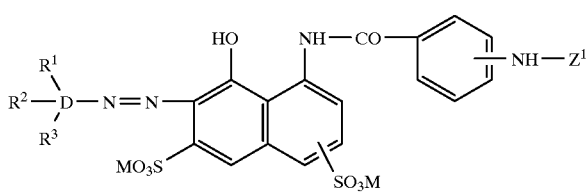
(11D)
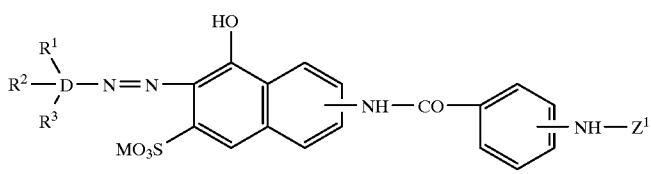
(11E)
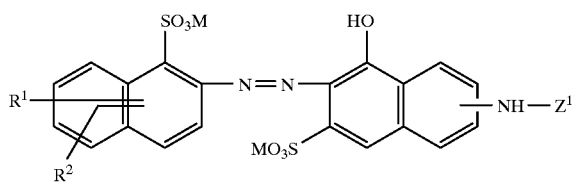
(11F)
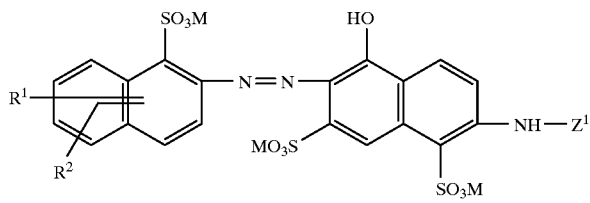
(11G)
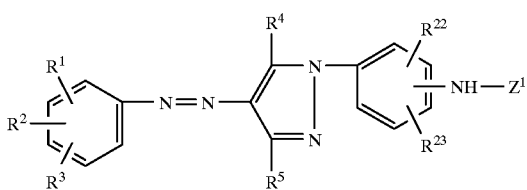
(11H)

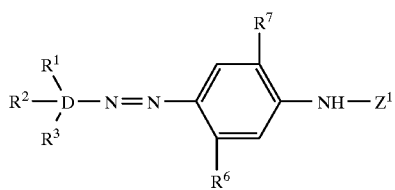
(11J)
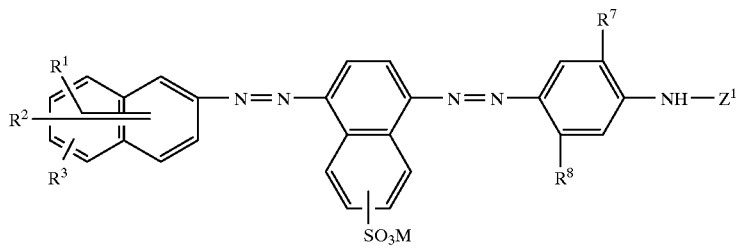
(11K)
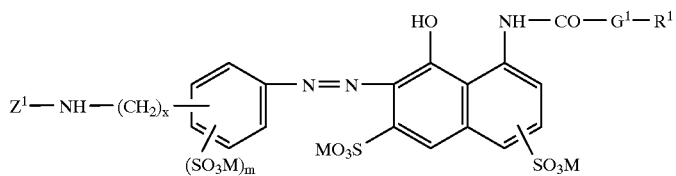
(11L)
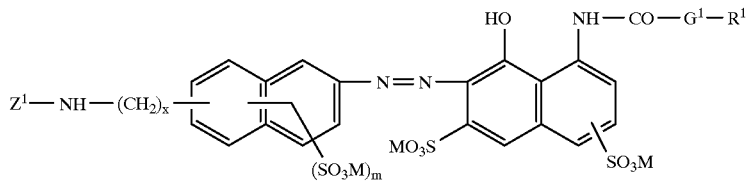
(11M)
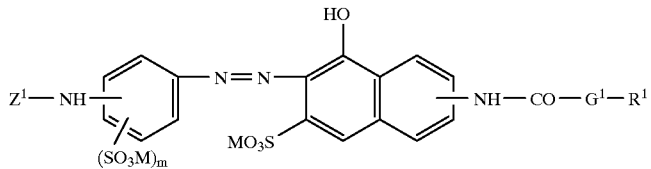
(11N)
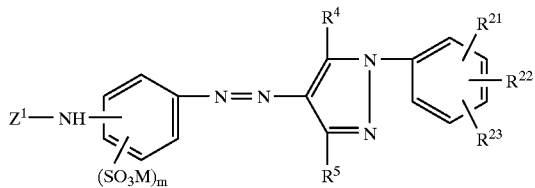
(11P)
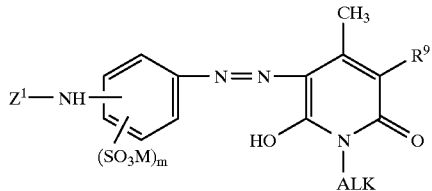
(11Q)

-continued
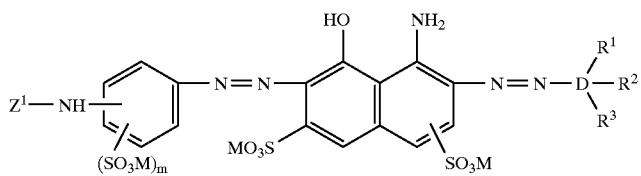
(11R)
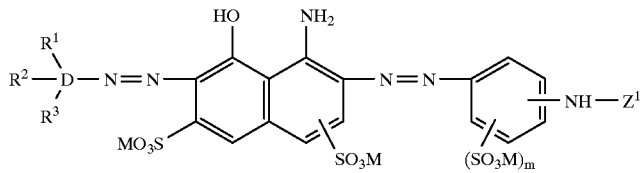
(11S)
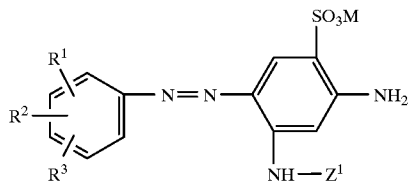
(11T)
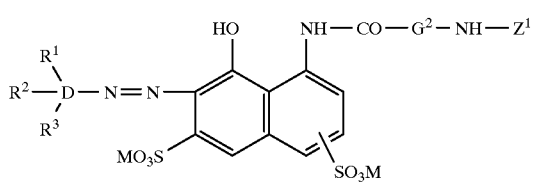
(11U)
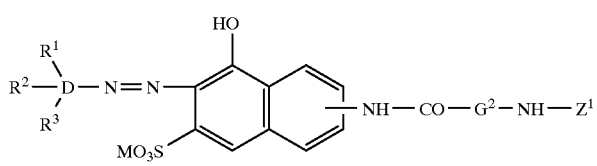
(11V)
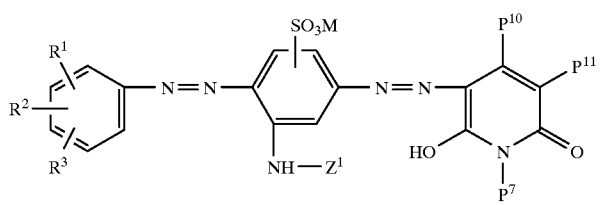
(11W)
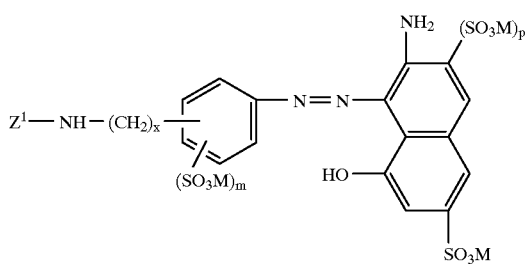
(11X)

-continued

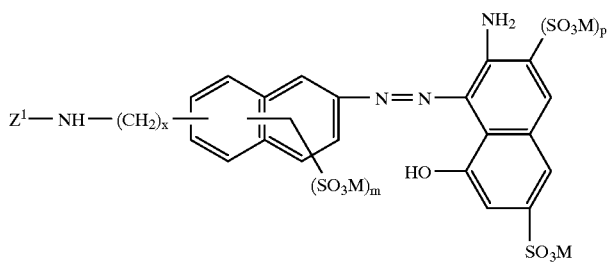

(11Y)

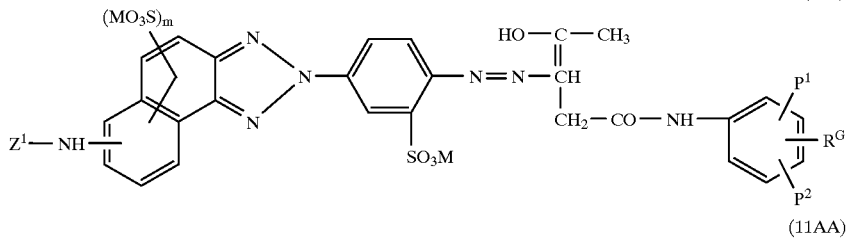

(11Z)

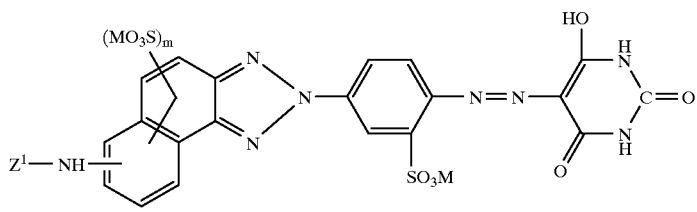

(11AA)

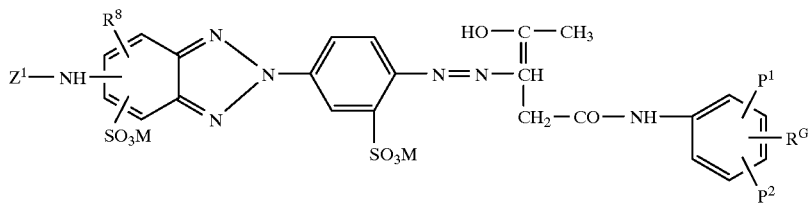

(11AB)

in which:

$Z^1$ is a radical of the abovementioned and defined formula (2a) or the 5,6-difluoropyrimidin-4-yl radical;

M has one of the abovementioned meanings;

D is a benzene ring or is a naphthalene ring, where the azo group is preferably bonded to the naphthalene ring in the β-position and where in the case in which D is the naphthalene ring $R^2$ and $R^3$ are preferably each, independently of one another, a hydrogen atom or a sulfo group;

$R^1$ is hydrogen or sulfo or a group Y—$SO_2$—W°— of the abovementioned meaning;

$R^2$ is hydrogen, alkyl or 1 to 4 carbon atoms, such as ethyl and in particular methyl, alkoxy of 1 to 4 carbon atoms, such as ethoxy and in particular methoxy, halogen, such as chlorine and bromine, carboxy or sulfo and is preferably hydrogen, methyl, methoxy, bromine, chlorine, sulfo or carboxy and particularly preferably hydrogen, methoxy or sulfo;

$R^3$ is hydrogen, alkyl of 1 to 4 carbon atoms, such as ethyl and in particular methyl, alkoxy of 1 to 4 carbon atoms, such as ethoxy and in particular methoxy, halogen, such as chlorine and bromine, nitro, carboxy or sulfo, preferably hydrogen, methyl, methoxy, chlorine, carboxy, sulfo or acetylamino and particularly preferably hydrogen, methoxy or sulfo;

$R^4$ is hydroxy or amino, preferably hydroxy;

$R^5$ is methyl, carboxy, carbomethoxy or carbethoxy, preferably methyl or carboxy;

$R^6$ is acetylamino, propionylamino, ureido or methyl;

$R^7$ is hydrogen, alkyl of 1 to 4 carbon atoms, such as methyl and ethyl, alkoxy of 1 to 4 carbon atoms, such as methoxy and ethoxy, halogen, such as bromine and in particular chlorine, preferably hydrogen, methyl, ethyl, methoxy or ethoxy;

$R^8$ is hydrogen or alkyl of 1 to 4 carbon atoms, such as methyl and ethyl, alkanoylamino of 2 to 5 carbon atoms, such as acetylamino and propionylamino, or ureido, preferably hydrogen, methyl, ethyl, methoxy, ethoxy, acetylamino or ureido;

$R^9$ is hydrogen, cyano, carbamoyl, sulfamoyl or sulfomethyl, preferably hydrogen or carbamoyl;

$R^{21}$ has one of the meanings of $R^1$;

$R^{22}$ has one of the meanings of $R^2$;

$R^{23}$ has one of the meanings of $R^3$;

ALK is alkyl of 1 to 4 carbon atoms, such as methyl and ethyl, or alkyl of 2 to 4 carbon atoms, such as ethyl and propyl, which can be substituted by hydroxy, carboxy, sulfo or sulfato;

$G^1$ is alkylene of 1 to 4 carbon atoms, such as ethylene and propylene, or is phenylene or phenylene substituted by sulfo, carboxy and/or alkyl of 1 to 4 carbon atoms, such as methyl;

$G^2$ is a group of the formula —NH-alk-, —NH-phen- or -alk-, in which alk is alkylene of 2 to 4 carbon atoms and phen is sulfophenylene or phenylene;

x is the number zero or 1;

m is the number zero, 1 or 2 (where if m is zero this group is hydrogen);

p is the number zero or 1 (where if p is zero this group is hydrogen);

in the compounds of the formulae (11A), (11F), (11N) and (11V) the amino or amido group in the 2- or 3-position is bonded to the 8-naphthol radical, and in the compounds of the formulae (11C), (11D), (11L), (11M), (11R) and (11U) one group —$SO_3M$ is bonded in the meta- or para-position relative to the amino or acylamino group.

Heavy metal complex azo dyes of particular importance are, for example, the 1,2-chromium complex and 1,2-cobalt complex and in particular the 1:1 copper complex monoazo compounds of the azo compounds of the following formulae (12A) and (12B):

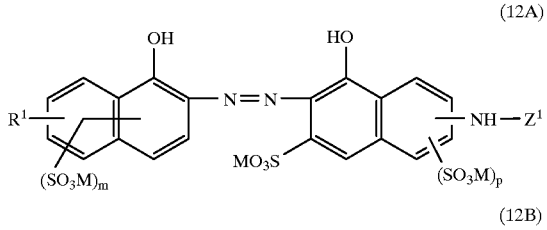

in which

M, m and $Z^1$ have the abovementioned particularly preferred meanings, and p is the number zero or 1 (where if p is zero this group is hydrogen).

Of the phthalocyanine dyes according to the invention, those are preferred which correspond to the formula (13)

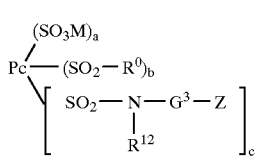

in which

Pc is the radical of an aluminum, nickel or preferably copper phthalocyanine;

$R^o$ is an amino group of the formula —$NR^{13}R^{14}$, in which $R^{13}$ and $R^{14}$ independently of one another are hydrogen or alkyl of 1 to 4 carbon atoms, which can be substituted by hydroxy or sulfo, or is a heterocyclic, N-containing radical, such as the morpholino or piperidino radical;

$R^{12}$ is a hydrogen or alkyl of 1 to 4 carbon atoms, such as methyl and ethyl;

$G^3$ is phenylene optionally substituted by 1 or 2 substituents from the group consisting of alkyl of 1 to 4 carbon atoms, such as ethyl and methyl, halogen, such as chlorine and bromine, carboxy and sulfo, for example sulfophenylene, or is alkylene of 2 to 6 carbon atoms, such as ethylene;

Z is the fiber-reactive group of the formula (2);

a is a number from zero to 3, b is a number from zero to 3 and c is a number from 1 to 2, where the sum of (a+b+c) is a number from 2 to 4.

Of these, those are particularly to be mentioned which correspond to the formulae (13a) and (13b)

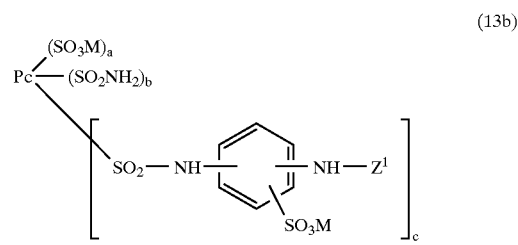

in which a is a number from 1 to 3, b is a number from 0 to 2 and c is a number from 1 to 2, where the sum of (a+b+c) is a number from 2 to 4, Pc is the radical of a nickel or preferably copper phthalocyanine and alk is alkylene of 2 to 4 carbon atoms, preferably ethylene, and $Z^1$ has the above meaning.

Copper formazan dyes according to the invention are in particular those which correspond to the formula (14)

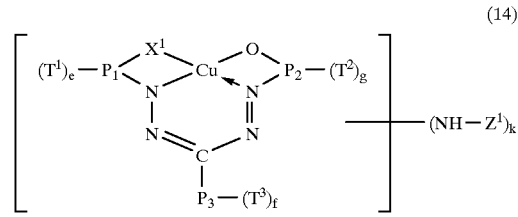

in which:

$Z^1$ has the abovementioned meaning;

$X^1$ is an oxygen atom or preferably the carbonyloxy group of the formula —COO—;

$P_1$ and $P_2$ are, independently of one another, each a benzene or naphthalene ring, where the nitrogen atom and the group $X^1$ are bonded to $P_1$ in the ortho-position relative to one another and the oxygen atom and the nitrogen atom are bonded to $P_2$ in the ortho-position relative to one another and the benzene nuclei or naphthalene nuclei can additionally be substituted by one or two substituents from the group consisting of halogen, such as chlorine, nitro, alkyl of 1 to 4 carbon atoms, such as methyl and ethyl, alkoxy of 1 to 4 carbon atoms, such as methoxy and ethoxy, sulfamoyl, sulfamoyl mono- or disubstituted by alkyl of 1 to 4 carbon atoms, alkylsulfonyl of 1 to 4 carbon atoms, such as methylsulfonyl and ethylsulfonyl, and phenylsulfonyl, where both $P_1$ and $P_2$ are preferably a benzene ring;

$P_3$ is a straight-chain or branched alkylene group of 2 to 6 carbon atoms, preferably of 2 to 4 carbon atoms, which can be substituted by a sulfophenyl group, or is a phenylene group or a naphthylene group which can be substituted by 1 or 2 substituents from the group consisting of methyl, ethyl, methoxy, ethoxy and chlorine, where $P_3$ is preferably a benzene ring;

$T^1$, $T^2$ and $T^3$ are, independently of one another, each a sulfo or carboxy group, preferably sulfo group;

e, f and g are, independently of one another, each the number zero, 1 or 2, where the sum of (e+f+g) is an integer from 1 to 4 and preferably 2 or 3, in particular 2, where if e or f or g is zero the group $T^1$ or $T^2$ or $T^3$ is a hydrogen atom;

k is the number 1 or 2, preferably 1, where the group —NH—$Z^1$ can be bonded to an aromatic radical of $P_1$, $P_2$ or $P_3$ and is preferably bonded to $P_2$.

Of the copper formazan dyes of the formula (14), those are preferred in which $P_1$ and $P_2$ are both a benzene ring, the group —NH—$Z^1$ is bonded to $P_2$ and $T^1$ and $T^2$ are each a sulfo group, where e and g both are the number 1. If the group —NH—$Z^1$ is bonded to $P_1$, e is the number zero, g is the number 2 and $T^2$ is a sulfo group. The group —$P_3$—$(T^3)_f$ is furthermore preferably the phenyl or a 2- or 4-sulfophenyl radical.

Of these, in particular those copper formazan dyes are to be emphasized which correspond to the formula (14a)

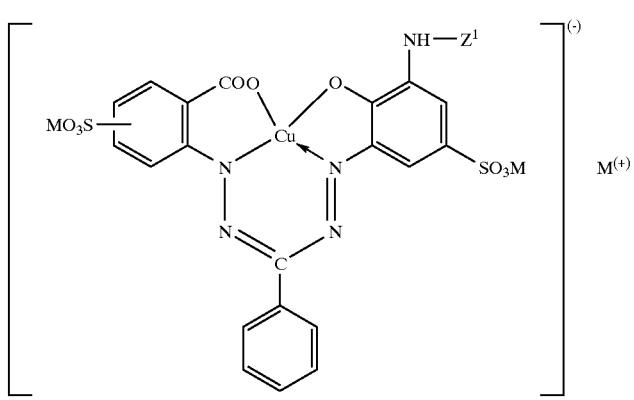

(14a)

in which M and $Z^1$ have the abovementioned particularly preferred meanings.

Of the triphendioxazine dyes according to the invention, those are to be emphasized which correspond to the formula (15)

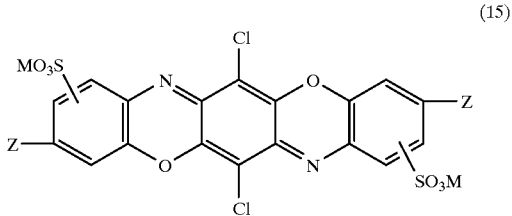

(15)

in which M and Z have one of the abovementioned meanings and the two sulfo groups —$SO_3M$ are preferably bonded to the benzene nucleus in the ortho-position relative to the oxygen atom of the heterocyclic ring.

Of the anthraquinone dyes according to the invention, those are particularly to be mentioned which correspond to the formula (16)

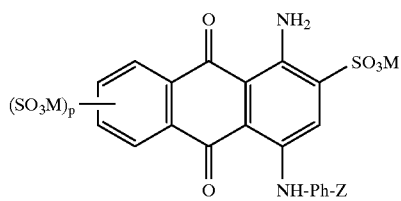

(16)

in which

M, Z and p have one of the abovementioned meanings and

Ph is phenylene optionally substituted by 1 or 2 substituents from the group consisting of alkyl of 1 to 4 carbon atoms, such as methyl and ethyl, alkoxy of 1 to 4 carbon atoms, such as methoxy and ethoxy, halogen, such as chlorine and bromine, carboxy and sulfo, or is phenylene which is substituted by 3 or 4 methyl groups, or is cyclohexylene.

The present invention furthermore relates to processes for the preparation of the dyes of the formula (1) according to the invention. They can be prepared in a manner which is customary per se analogously to known synthesis routes specific for the respective class of dye by reacting precursors typical of the respective dye, of which at least one contains one or two groups of the formula (2), with one another, or by reacting a compound of the formula (20)

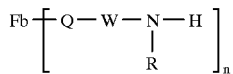

(20)

with Fb, R, Q, W and n having the abovementioned meanings with 4,5,6-trifluoropyrimidine in an equivalent amount, or by reacting a compound of the formula Fb—N($R^A$)H with Fb and $R^A$ having the abovementioned meaning, with a compound of the formula (21)

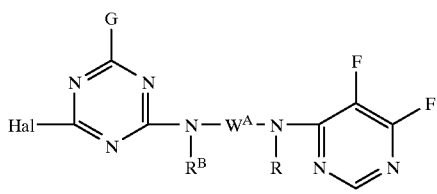

(21)

in which Hal is halogen, such as fluorine and chlorine, and G, $R^B$, $W^A$ and R have the abovementioned meanings, or by reacting a compound of the formula (22)

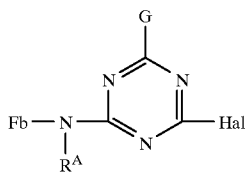

(22)

with Fb, $R^A$, G and Hal having the abovementioned meaning, with a compound of the formula (23)

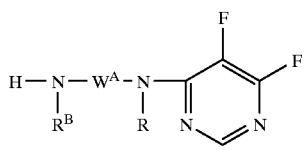

(23)

with $R^B$, $W^A$ and R having the abovementioned meaning.

In the condensation reactions, care is to be taken that the fiber-reactive groups are not damaged in the alkaline range.

The reactions of the starting compounds are carried out in suspension or solution in aqueous or aqueous-organic medium. If the reactions are carried out in an aqueous-organic medium, the organic medium is, for example, acetone, dimethylformamide, dimethyl sulfoxide or N-methyl-pyrrolidone. Advantageously, the hydrogen halide liberated in the condensation is continuously neutralized by addition of aqueous alkali metal or alkaline earth metal hydroxides, carbonates or bicarbonates. The condensation reaction of the 4,5,6-trifluoropyrimidine is as a rule carried out at a temperature between –5° C. and +50° C., preferably at a temperature between 0° C. and +40° C., and at a pH between 2 and 11, preferably between 4 and 10.

The reaction of the starting compounds of the formula Fb—N($R^A$)H and of the formula (21) is as a rule carried out at a temperature between –5° C. and +60° C., if Hal is fluorine preferably at a temperature between 0° C. and 30° C., and at a pH between 3 and 10, preferably between 6 and 9.

The reaction of the compounds of the formulae (22) and (23) is as a rule carried out at a temperature between –5° C. and +30° C., if Hal is fluorine preferably at a temperature between 0° C. and 30° C., and at a pH between 3 and 10, preferably between 6 and 9.

The starting compounds Fb—N($R^A$)H or of the formula (20) and their precursors are generally known and described in large numbers in the literature.

The starting compounds of the formulae (21) and (23) can be prepared in a manner which is customary and known per se by reaction of a dihalo-s-triazine substituted by the substituent G with an amine of the formula H($R^B$)N—$W^A$—N(R)H and then with 4,5,6-trifluoropyrimidine or by reaction of this diamino compound with 4,5,6-trifluoropyrimidine. The starting compound of the formula (22) is obtained analogously by procedures known per se by reaction of a compound of the formula Fb—N($R^A$)H of the abovementioned meaning with a dihalo-s-triazine substituted by the substituent G.

Aromatic amines which serve as diazo components for the synthesis of the azo dyes of the formula (1) according to the invention and correspond to the formula $D^1$—$NH_2$ are, for example:

1-amino-2-, -3- or -4-methoxybenzene, 1-amino-2-, -3- or 4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminodiphenyl, 1-aminobenzene-2-, -3- or 4-carboxyic acid, 2-aminodiphenyl ether, 1-aminobenzene-2-, -3- or 4-sulfonic acid amide, -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino4- or -5-chlorobenzene-2-sulfonic acid, 1-amino6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino6-ethoxybenzene-3- or -4-sulfonic acid, 1-amino-2,4-dimethoxybenzene-4-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1,4-diaminobenzene-2,5-disulfonic acid, 1-amino-3- or 4-nitrobenzene-6-sulfonic acid, 1-aminonaphthalene, 2-aminonaphthalene, 1-aminonaphthalene-2-, 4-, -5-, -6-, -7- or -8-sulfonic acid, 2-aminonaphthalene-3,6- or -5,7-disulfonic acid, 1-aminonaphthalene-3,6- or -5,7-disulfonic acid, 2-aminonaphthalene-1-sulfonic acid, 2-aminonaphthalene-1,5-, -1,7-, -3,6-, -5,7-, 4,8- or -6,8-disulfonic acid, 1-aminonaphthalene-2,5,7-trisulfonic acid, 2-aminonaphthalene-1,5,7-, 3,6,8- or 4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 2-(β-sulfatoethylsulfonyl)aniline, 3-(β-sulfatoethylsulfonyl)aniline, 4-(β-sulfatoethylsulfonyl)aniline, 2-carboxy-5-(β-sulfatoethylsulfonyl)aniline, 2-chloro-3-(sulfatoethylsulfonyl)aniline, 2-chloro-4-(β-sulfatoethylsulfonyl)aniline, 2-bromo-4-(β-sulfatoethylsulfonyl)aniline, 4-methoxy-3-(β-sulfatoethylsulfonyl)aniline, 4-chloro-3-(β-sulfatoethylsulfonyl)aniline, 2-ethoxy-4- or -5-(β-sulfatoethylsulfonyl)aniline, 2-methyl-4-(β-sulfatoethylsulfonyl)aniline, 2-methoxy-5- or 4-(β-sulfatoethylsulfonyl)aniline, 2,4-diethoxy-5-(β-sulfatoethylsulfonyl)aniline, 2,4-dimethoxy-5-(β-sulfatoethylsulfonyl)aniline, 2,5-dimethoxy-4-(β-sulfatoethylsulfonyl)aniline, 2-methoxy-5-methyl-4-(β-sulfatoethylsulfonyl)aniline, 2- or 3- or 4-(β-thiosulfatoethylsulfonyl)aniline, 2-methoxy-5-(β-thiosulfatoethylsulfonyl)aniline, 2-sulfo-4-(β-phosphatoethylsulfonyl)aniline, 2-sulfo-4-vinylsulfonylaniline, 2-hydroxy-4- or -5-(β-sulfatoethylsulfonyl)aniline, 2-chloro-4- or -5-(β-chloroethylsulfonyl)aniline, 2-hydroxy-5-(β-sulfatoethylsulfonyl)aniline, 2-hydroxy-3-sulfo-5-(β-sulfatoethylsulfonyl)aniline, 3- or 4-(β-acetoxyethylsulfonyl)aniline, 6-carboxy-1-sulfo-2-aminonaphthalene, 5-(β-sulfatoethylsulfonyl)-2-aminonaphthalene, 6- or 7- or 8-(β-sulfatoethylsulfonyl)-2-aminonaphthalene, 6-(β-sulfatoethylsulfonyl)-1-sulfo-2-aminonaphthalene, 5-(β-sulfatoethylsulfonyl)-1-sulfo-2-aminonaphthalene, 8-(β-sulfatoethylsulfonyl)-6-sulfo-2-aminonaphthalene, 4-[N-methyl-N-(β-sulfatoethylsulfonyl)]aminoaniline, 3-[N-methyl-N-(β-sulfatoethylsulfonyl)]aminoaniline, 4-[β-(β-sulfatoethylsulfonyl)ethyl]aniline, 3- or 4-[β-(β'-chloroethylsulfonyl)ethylamino]aniline, 3- or 4-[β-(β'-sulfatoethylsulfonyl)ethylamino]aniline, 3- or 4-[γ-(β'-chloroethylsulfonyl)propylamino]aniline, 3- or 4-[γ-(β'-sulfatoethylsulfonyl)propylamino]aniline and 3- or 4-[γ-(vinylsulfonyl)propylamino]aniline.

Starting compounds corresponding to the formula H(R)N—W—Q—D²—NH₂ are, for example, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyl), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene4-carboxylic acid, 1,2-diaminobenzene-4-carboxylic acid, 1,3-diaminobenzene-5-carboxylic acid, 1,4-diaminobenzene-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 1-amino-4-methyl-5-aminomethylbenzene-6-sulfonic acid, 4,4'-diaminodiphenyl-3-sulfonic acid, 1,4-diaminonaphthalene-6-sulfonic acid, 1,4-diamino-naphthalene-2-sulfonic acid, 2,6-diaminonaphthalene-4,8-disulfonic acid and 2,6-diaminonaphthalene-8-sulfonic acid.

Starting compounds which serve for the preparation of disazo dyes of the formula (1) according to the invention first as a coupling component and then, in the form of the amino azo compound formed, as a diazo component and correspond to the formula H—E—NH₂ are, for example, aniline, 3-methylaniline, 2-methoxy-5-methylaniline, 2,5-dimethylaniline, 3-ureidoaniline, 3-acetylaminoaniline, 3-propionylaminoaniline, 3-butyrylaminoaniline, 3-methoxyaniline, 2-methyl-5-acetylaminoaniline, 2-methoxy-5-acetylaminoaniline, 2-methoxy-5-methylaniline, 3-(hydroxyacetylamino)aniline, 1,3-diaminobenzene-4-sulfonic acid, 1-aminonaphthalene-6-, -7- or -8-sulfonic acid, 1-amino-2-methoxy-naphthalene-6-sulfonic acid, 2-amino-5-hydroxynaphthalene-7-sulfonic acid, 2-amino-5-hydroxynaphthalene-1,7-disulfonic acid, 2-amino-8-hydroxynaphthalene-6-sulfonic acid, 2-(4'-aminobenzoylamino)-5-naphthol-7-sulfonic acid, 1-(4'-amino-2'-sulfophenyl)-3-methyl-5-pyrazolone, 1-(4'-amino-2'-sulfophenyl)-3-carboxy-5-pyrazolone and N-(acetoacetyl)-3-sulfo-4-aminoanilide.

Starting compounds for the preparation of the azo compounds of the formula (1) according to the invention which can serve as coupling components and correspond to the formula H—K¹ or H—K²—Q—W—N(R)H or H—K—H are, for example: phenol, 1-hydroxy-3- or 4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or 6,8-disulfonic acid, 1-hydroxynaphthalene-4-sulfonic acid, 1-hydroxynaphthalene-4,6- or 4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- and 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or ethylamino-8-hydroxynaphthalene-6- sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene3,6- or -4,6-disulfonic acid, 1-acetylamino-8-hydroxynaphthalene-3,6- and -4,6-disulfonic acid (1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazolone-(5), 1-phenyl-3-methyl-5-pyrazolone, 1-(4'-sulfophenyl)-3-methyl-5-pyrazolone, 1-(4'-sulfophenyl)pyrazolone-(5)-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphthyl-[2']-3-methyl-5-pyrazolone, 1-(5',7'-disulfonaphthyl-[2']-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyridone-2,2,4,6-triamino-3-cyanopyridine, 2-(3'-sulfophenylamino)-4,6-diamino-3-cyanopyridine, 2-(2'-hydroxyethylamino-3-cyano-4-methyl-6-aminopyridine, 2,6-bis(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-7-(phenylazo)naphthalene-3,6-disulfonic acid, 1-amino-8-hydroxy-7-(4'-sulfophenylazo)naphthalene-3,6-disulfonic acid, 1-amino-8-hydroxy-7-(2',5'-disulfophenylazo)naphthalene-3,6-disulfonic acid, 1-[4'-(β-sulfatoethylsulfonyl)phenyl]-3-methyl-5-pyrazolone, 1-[4'-(vinylsulfonyl)phenyl]-3-methyl-5-pyrazolone, 1-[4'-(β-sulfatoethylsulfonyl)phenyl]-3-carboxy-5-pyrazolone, 1-[3'-[β-chloroethylsulfonyl)benzoylamino]-3,6-disulfo-8-naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-(β-sulfatoethylsulfonyl)benzoylamino]-4,6-disulfo-8-naphthol, 2-[3'-(β-chloroethylsulfonyl)benzoylamino]-6-sulfo-8-naphthol, 2-[3'-(vinylsulfonyl)benzoylamino]-6-sulfo-8-naphthol, 3-[3'-(β-chloroethylsulfonyl)benzoylamino]-6-sulfo-8-naphthol, 3-[3'-(vinylsulfonyl)benzoylamino]-6-sulfo-8-naphthol, 6-sulfo-1-[3'-(β-chloroethylsulfonyl)benzoylamino]naphthol, 7-sulfo-[3'-(vinylsulfonyl)benzoylamino]naphthol, 2-[N-methyl-N-(β-sulfatoethylsulfonyl)amino]-6-sulfo-8-naphthol, 3-[N-methyl-N-(β-sulfatoethylsulfonyl)amino]-6-sulfo-8-naphthol, 2-[N-ethyl-N-(β-sulfatoethylsulfonyl)amino]-6-sulfo-8-naphthol, 1-[N'-(3'-β-chloroethylsulfonylphenyl)ureido]-3,6-disulfo-8-naphthol, 1-[N'-(3'-vinylsulfonylphenyl)ureido]-3,6-disulfo-8-naphthol, 1-[N'-(3'-vinylsulfonylpropyl)ureido]-3,6-disulfo-8-naphthol, 1-[N'-(3'-β-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-β-chloroethylsulfonylpropyl)ureido]-4,6-disulfo-8-naphthol, 2-[N'-(3'-β-sulfatoethylsulfonylphenyl)ureido]-6-sulfo-8-naphthol, 2-[N'-(3'-chloroethylsulfonylpropyl)ureido]-6-sulfo-8-naphthol, 3-[N'-(3'-β-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3"-β-chloroethylsulfonyl)phenyl]ureidoaniline, 3-[N'-(3"-β-sulfatoethylsulfonyl)phenyl]ureidoaniline and 6-sulfo-1-[N'-(3"-β-sulfatoethylsulfonyl)phenyl]ureido-8-naphthol.

Coupling components corresponding to the formula H—K—N(R)H or H—K—Q—W—N(R)H, which can be used for the synthesis of the azo dyes according to the invention having the fiber-reactive 4,5-difluoropyrimidin-6-yl radical in the coupling component, where in the initially obtained amino group-containing azo dye corresponding to the formula (20) the fiber-reactive 4,5-difluoropyrimidin-6-yl radical can be or is introduced into its amino group —N(R)H, are, for example aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-(hydroxyacetylamino)aniline, 3-ureidoaniline, 2-methyl-5-acetylamino-aniline, 2-methoxy-5-acetylaminoaniline, 2-methoxy-5-methylaniline, 1-aminonaphthalene-6-sulfonic acid, 1-amino-naphthalene-7-sulfonic acid, 4-sulfo-1,3-diaminobenzene, 6-sulfo-2-methoxy-1-aminonaphthalene, 5,7-disulfo-2-aminonaphthalene, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 1-amino-8-naphthol-3,6-disulfonic acid, 1-amino-8-hydroxy-4,6-disulfonic acid, 1-amino-8-hydroxynaphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)- and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo)naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-(β-aminoethyl)-3-cyano-4-methyl-6-hydroxypyrid-2-one, 1-(γ-aminopropyl)-3-sulfomethyl-4-methyl-6-hydroxypyrid-2-one, 1,3-diaminobenzene, 3-[N,N-di-(β-hydroxyethyl)]aminoaniline, 3-[N,N-di-(β-sulfatoethyl)]amino-4-methoxyaniline, 3-(sulfobenzylamino)aniline, 3-(sulfobenzoylamino)-4-chloroaniline and 3-[N,N-di-(sulfobenzyl)]aminoaniline, 2-sulfo-5-acetylaminoaniline, 2-amino-5-naphthol-7-sulfonic acid, 2-amino-8-naphthol-6-sulfonic acid, 1-(4'-aminobenzoyl)amino-8-hydroxynaphthalene-3,6-disulfonic acid, 1-(4'-aminobenzoyl)amino-8-hydroxynaphthalene-4,6-disulfonic acid, 1-(3'-aminobenzyl)amino-8-hydroxynaphthalene-3,6-disulfonic acid, 1-(3'-aminobenzoyl)amino-8-hydroxynaphthalene-4,6-disulfonic acid, 1-(2'-aminobenzoyl)amino-8-hydroxynaphthalene-3,6-disulfonic acid, 1-(2'-aminobenzoyl)-amino-8-hydroxynaphthalene-4,6-disulfonic acid, 2-(3'-aminobenzoyl)amino-5-hydroxynaphthalene-7-sulfonic acid, 2-(2'-aminobenzoyl)amino-5-hydroxynaphthalene-7-sulfonic acid, 2-(4'-aminobenzoyl)amino-8-hydroxynaphthalene-6-sulfonic acid, 2-(3'-aminobenzoyl)amino-8-hydroxynaphthalene-6-sulfonic acid, 2-(2'-aminobenzoyl)amino-8-hydroxynaphthalene-6-sulfonic acid, 2-(4'-aminobenzoyl)amino-5-naphthol-7-sulfonic acid, 1-(4'-amino- or 1-(4'-acetylamino-2-sulfophenyl)-3-methyl- or -3-carboxy-5-pyrazolone, 3-sulfo-4-amino-acetoacetylanilide, 1-amino-8-naphthol-3,6- or -4,6-disulfonic acid, 1-(3'-aminobenzoylamino)- or 1-(4'- aminobenzoylamino)-8-naphthol-3,6- or 4,6-disulfonic acid, 1-acetylamino-8-naphthol-3,6- or 4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl-N-acetylamino)- or 2-methylamino-5-naphthol-7-sulfonic acid, N-methylaniline and N-propyl-m-toluidine.

If the starting materials used are diazo components of the formula $H(R)N-W-Q-D^2-NH_2$, these can also be employed in the form of the monoacylaminoamino compounds, where the acyl radical is in particular the acetyl radical. These monoacylaminoamino compounds are first diazotized and coupled with a couplable compound; then the acyl radical is hydrolytically removed, and the amino group which has thus now become free again can be bonded to the fiber-reactive 4,5-difluoropyrimidin-6-yl radical. Such monoacylated diamines are, for example, 2-sulfo-5-acetylaminoaniline and 2-sulfo-4-acetylaminoaniline. In the same manner, amino group-containing coupling components can be employed in the coupling reaction in the form of the acylamino derivative, where the acyl radical can then also be hydrolytically removed here in order to bond the liberated amino group with the fiber-reactive 4,5-difluoropyrimidin-6-yl radical.

Bivalent coupling components which can be used for the synthesis of disazo dyes according to the invention, in which the bivalent coupling radical is bonded with two diazo components, of which one or both contain a fiber-reactive radical Z, for example of dyes of the formula (3d), are, for example, resorcinol, 1,3-diaminobenzene, 5,5'-dihydroxy-7,7'-disulfo-2,2'-dinaphthylurea, 1,8-dihydroxy-3,6-disulfonaphthalene and in particular 1-amino-8-naphthol-3,6-disulfonic acid and 1-amino-8-naphthol-4,6-disulfonic acid.

If the starting materials used in the synthesis according to the invention of the azo dyes or diazo or coupling components already contain the group of the formula (2), the reactions are carried out in the customary procedure of diazotization and coupling reactions, thus the diazotization as a rule at a temperature between −5° C. and +15° C. and a pH of below 2 by means of a strong acid and alkali metal nitrite in preferably aqueous medium and the coupling reaction as a rule at a pH between 1.5 and 4.5 in the case of an amino group-containing coupling component and at a pH of between 3 and 7.5 in the case of a hydroxy group-containing coupling component and at a temperature between 0 and 25° C., also preferably in aqueous medium.

In the synthesis according to the invention of heavy metal complex azo dyes, for example those corresponding to the formulae (3h) and (3i), the starting materials used are as a rule of those heavy metal-free azo compounds which in the coupling component contain a phenolic or naphtholic hydroxy group bonded in the ortho-position or vicinal position relative to the azo group and whose diazo component radical contains a hydroxy group or a lower alkoxy group, such as a methoxy group, bonded in the ortho position relative to the azo group, where the heavy metal-free starting azo compounds can additionally contain an acylamino radical which is bonded, such as an acetylamino radical. For example, in the synthesis of the copper complex azo dyes of the formula (3i) the starting compound used can be one corresponding to the formula (25)

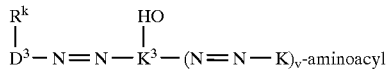

(25)

in which $D^3$, K, $K^3$ and v have one of the abovementioned meanings and $R^k$ is a hydrogen atom or a hydroxy or methoxy group bonded in the ortho-position relative to the azo group on $D^3$, and this acylamino group-containing starting azo compound can be reacted with a copper-donating agent, such as a copper salt, analogously to known and customary procedures. If $R^k$ is a hydrogen atom or a methoxy group, the compound (25) can be subjected to an oxidative or dealkylating coppering reaction to be carried out in a customary way. The copper complex azo compound with the acylamino group now obtained can then be reacted with 4,5,6-trifluoropyrimidine analogously to known procedures by or with hydrolysis of the acylamino group to the amino group to give the dye of the formula (1) according to the invention.

The separation of the dyes of the formula (1) prepared according to the invention from the synthesis batches is carried out by generally known methods, either by precipitating from the reaction medium by means of electrolytes, such as, for example, sodium chloride or potassium chloride, or by evaporating the reaction solution, for example by spray drying, it being possible to add a buffer substance to this reaction solution.

The dyes of the formula (1)—called dyes (1) in the following—are suitable for dyeing (which includes printing) all sorts of materials, such as silk, leather, wool, polyamide fibers and polyurethanes, and in particular cellulose-containing fiber materials of all types. Such fiber materials are, for example, the natural cellulose fibers, such as cotton, linen and hemp, and also cellulose and regenerated cellulose. The dyes (1) are also suitable for dyeing or printing hydroxy group-containing fibers which are contained in mixed fabrics, e.g. mixtures of cotton with polyester fibers or polyamide fibers.

The dyes (1) can be applied to the fiber material and fixed to the fiber in various ways, in particular in the form of aqueous dye solutions and printing pastes. They are suitable both for the exhaust process and for dyeing by the pad-dyeing process, according to which the goods are impregnated with aqueous, optionally salt-containing, dye solutions and the dye is fixed after an alkaline treatment or in the presence of alkali, if appropriate under the action of heat. These dyeing and printing processes are described in large numbers in the general technical literature and in the patent literature, for example in the publications mentioned at the beginning.

The present invention therefore also relates to the use of the dyes (1) for dyeing (including printing) these materials or processes for dyeing (and printing) such materials in a procedure customary per se, in which a dye (1) is employed as the coloring agent, by applying the dye (1) to the material in the aqueous medium and fixing it to the material by means of heat or by means of an alkaline compound or by means of both.

The dyes (1) are distinguished by high reactivity, good fixing power and a very good build-up power. They can therefore be employed by the exhaust dyeing process at low dyeing temperatures and require only short steaming times in the pad-steam process. The degrees of fixing are high, and the nonfixed portions can easily be washed out, the difference between the degree of exhaustion and the degree of fixing being remarkably small, i.e. the soaping loss is very low. The dyes (1) are also particularly suitable for printing, especially on cotton, but likewise also for printing nitrogen-containing fibers, e.g. wool or silk or mixed fabrics which contain wool or silk.

In addition, the dyes (1) according to the invention are distinguished in that after the dyeing process nonfixed portions of dye can very easily be washed out of the fiber material without whites which are additionally in the washing process being stained by the dissolving dye. Advantages for the dyeing process result from this; wash cycles and thus costs are saved.

The dyeings and prints produced using the dyes (1) have, in particular on cellulose fiber materials, a high intensity of color and a high fiber-dye binding stability both in the acidic and in the alkaline range, furthermore a good light fastness and very good wet fastness properties, such as washing, water, seawater, cross-dyeing and perspiration fastnesses, and a good pleating fastness, ironing fastness and rubbing fastness.

The following Examples serve to illustrate the invention. The parts are parts by weight, and the percentages are percentages by weight, if not stated otherwise. Parts by weight relate to parts by volume as the kilogram relates to the liter.

The compounds described in terms of a formula in the Examples are indicated in the form of the free acid; in general, they are prepared and isolated in the form of their alkali metal salts, such as lithium, sodium or potassium salts, and used for dyeing in the form of their salts. Likewise, the starting compounds and components mentioned in the following Examples, in particular Tabular Examples, in the form of the free acid can be employed as such in the synthesis or in the form of their salts, preferably alkali metal salts.

The absorption maxima ($\lambda_{max}$) in the visible range indicated for the dyes according to the invention were determined in aqueous solution by means of their alkali metal salts. In the Tabular Examples, the $\lambda_{max}$ values are placed in brackets in the color shade data; the wavelength data relate to nm.

EXAMPLE 1 a) 6.7 parts of 4,5,6-trifluoropyrimidine are steadily and slowly added with stirring under a nitrogen atmosphere at a pH of 9.5 to 10 to a 0 to 5° C. solution of 16 parts of 1-amino-8-hydroxy-3,6-disulfo-naphthalene in 150 parts of water, the pH range being maintained by means of addition of dilute aqueous sodium hydroxide solution. The mixture is stirred for a further hour and a pH of 7 is then set.

b) A diazonium solution prepared in a customary manner from 8.7 parts of 2-sulfoaniline in 100 parts of water using 10 parts by volume of concentrated aqueous hydrochloric acid and 25 parts by volume of an aqueous 2N sodium nitrite solution is added to the compound prepared under a), serving as a coupling component, and the coupling reaction is carried out at a pH of 6 and a temperature increasing slowly from 5° C. to 20° C. The mixture is additionally stirred for some time and the dye according to the invention which, written in the form of the free acid, has the formula

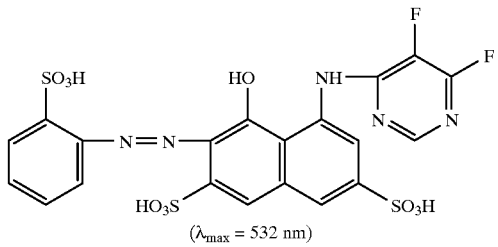

($\lambda_{max}$ = 532 nm)

is isolated in a customary manner, for example by salting out with sodium chloride.

The dye according to the invention exhibits very good application and fiber-reactive properties and dyes the materials mentioned in the description, such as, in particular, cellulose fiber materials, in intense red shades having good fastness properties, of which, in particular, the good chlorinated bathing water fastnesses can be emphasized, by the dyeing and printing processes customary in the art for fiber-reactive dyes.

EXAMPLE 2

A diazonium salt suspension of 20.5 parts of 1-sulfo-6-(β-sulfatoethylsulfonyl)-2-aminonaphthalene in 500 parts of water at 0° C. prepared in a customary manner by means of 15 parts of a 31% strength aqueous hydrochloric acid and 10 parts of an aqueous 5N sodium nitrite solution is added with stirring to a solution of the coupling component prepared according to the details of Example 1a), the pH is adjusted to 7 and the mixture is additionally stirred for some time while maintaining the pH at approximately 15 to 20° C. The dye solution prepared in this way is treated with 12 parts of disodium hydrogenphosphate and adjusted to a pH of 7 using phosphoric acid. The azo dye according to the invention of the formula (written in the form of the free acid)

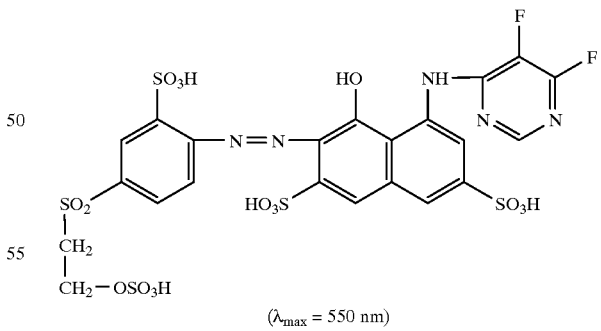

($\lambda_{max}$ = 550 nm)

obtained is isolated in a customary manner, for example by evaporation under reduced pressure at 50° C. The dye exhibits very good application properties and dyes, for example, cellulose fiber materials in brilliant blue-tinged red shades with good fastnesses, of which, in particular, the chlorinated bathing water fastness can be emphasized, with a high degree of fixing by the application methods customary for fiber-reactive dyes.

EXAMPLE 3

A neutral solution of 23.9 parts of 3-amino-6-sulfo-8-hydroxynaphthalene in 200 parts of water is treated with good stirring at 20 to 35° C. with 13.4 parts of 4,5,6-trifluoropyrimidine, the pH of the reaction batch being kept at a pH of 5.5 using aqueous lithium carbonate solution. The suspension obtained is treated with stirring with a diazonium salt suspension of 30.3 parts of 1,5-disulfo-2-aminonaphthalene prepared in a customary manner, and the coupling reaction is completed at a temperature of 10 to 15° C. and a pH of between 6.5 and 7.

The azo dye according to the invention obtained has, written in the form of the free acid, the formula

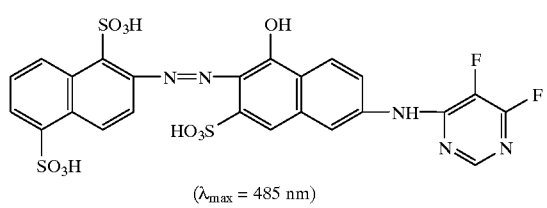

($\lambda_{max}$ = 485 nm)

and is isolated as an alkali metal salt (sodium salt) by salting out with sodium chloride in a customary manner. It has good dyeing properties and yields intense orange-colored dyeings and prints with good fastness properties on the materials mentioned in the description, such as, in particular, cellulose fiber materials, such as cotton, by the application and fixing processes customary in the art for fiber-reactive dyes.

EXAMPLE 4

For the preparation of an azo dye according to the invention, the procedure used is according to the details of Example 3, but instead of the aqueous diazonium salt suspension used there an aqueous suspension of a diazonium salt formed from 20.3 parts of 2-sulfo-4-methoxyaniline prepared in a customary manner is employed. The azo dye according to the invention of the formula (written in the form of the free acid)

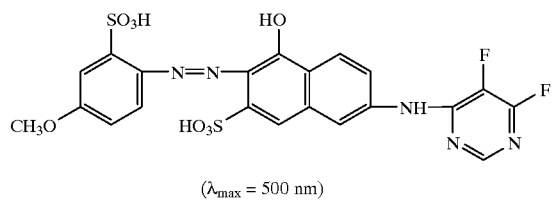

($\lambda_{max}$ = 500 nm)

obtained is isolated as an alkali metal salt, for example by salting out with sodium chloride, in a customary manner. It exhibits very good application properties and dyes the fiber materials mentioned in the description, such as wool and, in particular, cellulose fiber materials, such as cotton, in intense orange shades having good fastness properties.

EXAMPLE 5

While maintaining a pH of between 5.8 and 6.2 and a temperature of approximately 40° C., 13.8 parts of 4,5,6-trifluoropyrimidine are slowly stirred into a neutral solution of 54.5 parts of the azo compound 4-(3',6',8'-trisulfonaphth-2'-yl)azo-3-ureidoaniline in 800 parts of water, the batch is additionally stirred for some time while maintaining these reaction conditions until completion of the reaction, the solution is clarified in a customary manner after completion of the synthesis and the dye according to the invention of the formula (written in the form of the free acid)

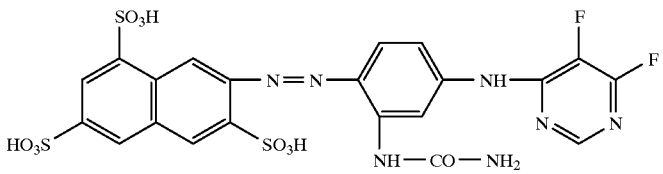

($\lambda_{max}$ = 420 nm)

is isolated in a customary manner as an alkali metal salt (sodium salt). It exhibits very good fiber-reactive dye properties and dyes the materials mentioned in the description, such as, in particular, cellulose fiber materials, in intense red-tinged yellow shades having good fastness properties by the application and fixing processes customary in the art for fiber-reactive dyes.

ous synthesis solution of the disazo dye according to the invention obtained.

The disazo dye is isolated in a customary manner, for example by evaporation of the synthesis solution. It has, written in the form of the free acid, the formula

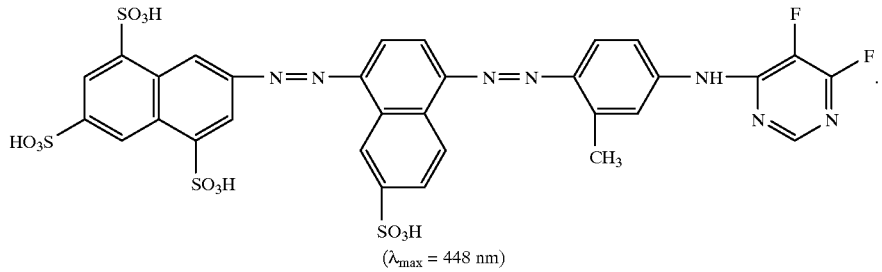

($\lambda_{max}$ = 448 nm)

EXAMPLE 6

A solution of 21.1 parts of 4-(4',8'-disulfonaphth-2'-yl)azo-3-acetylaminoaniline in 1000 parts of water having a temperature of 35° C. and a pH of 8.5 is treated with 7.0 parts of 4,5,6-trifluoropyrimidine with good stirring and while maintaining a pH of between 6.5 and 7 by means of an aqueous sodium carbonate solution. The batch is additionally stirred for approximately two to three hours and the azo dye according to the invention of the formula (written in the form of the free acid)

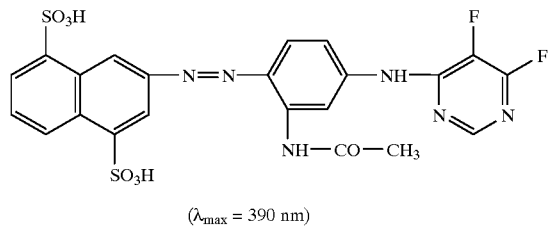

($\lambda_{max}$ = 390 nm)

is isolated in a customary manner, for example by salting out with sodium chloride. It has very good fiber-reactive application properties and dyes the materials mentioned in the description, such as, for example, cotton, in green-tinged yellow shades having good fastness properties.

EXAMPLE 7

A neutral solution of 40.9 parts of the disazo compound 4-[4'-(4",6",8"-trisulfonaphth-2"-yl)azo-6'-sulfonaphth-1'-yl]-3-methylaniline (which can be prepared in a customary manner by coupling of 6-sulfo-1-aminonaphthalene with the diazonium salt of 2-aminonaphthalene-4,6,8-trisulfonic acid and diazotization of the monoazo compound obtained and coupling with 3-methylaniline) in 300 parts of water is treated with 9.2 parts of 4,5,6-trifluoropyrimidine at a temperature of 40° C. while maintaining a pH of between 6 and 7. The mixture is additionally stirred for approximately 3 hours under the reaction conditions indicated and 8.9 parts of disodium hydrogenphosphate are then added to the aque- According to the dyeing processes customary in the art for fiber-reactive dyes, intense, fast dyeings in red-tinged brown shades are obtained using the disazo dye according to the invention.

EXAMPLE 8 a) 9.9 parts of 2,4-diaminobenzenesulfonic acid are dissolved in 100 parts of water at a pH of 6.5 by means of lithium hydroxide. 7.6 parts of 4,5,6-trifluoropyrimidine are slowly stirred into this solution at 35 to 40° C. while simultaneously maintaining the pH of 6.5 by means of lithium carbonate. The mixture is additionally stirred for 2 hours and then 100 parts of ice and one part of sodium fluoride and then 6.6 parts of cyanuric fluoride are added with further good stirring; during the reaction the pH of the batch falls to approximately 3.7 to 3.8. The batch is additionally stirred for a short time and filtered.

b) To this solution of the lithium salt of 2-(2',4'-difluoro-1',3',5'-triazin-6'-yl)amino4-(5',6'-difluoropyrimidin-4'-yl)aminobenzenesulfonic acid, 170 parts of a neutral aqueous solution of the lithium salt of 10.4 parts of 3-amino-6-sulfo-8-hydroxynaphthalene are added with stirring at 5° C.; while maintaining a pH of 5.5 by means of aqueous sodium carbonate solution, the temperature is allowed to rise to 20° C., and after this the mixture is additionally stirred for 20 minutes and the pH is then increased to 6.5. After a further 20 minutes, an aqueous suspension of the diazonium salt of 14.1 parts of 1,5-disulfo-2-aminonaphthalene in hydrochloric acid prepared in the customary manner is added and the coupling is completed at a pH of 6.5 during the course of approximately one hour.

The dye according to the invention is isolated in a customary manner by salting out. It has, written in the form of the free acid, the formula

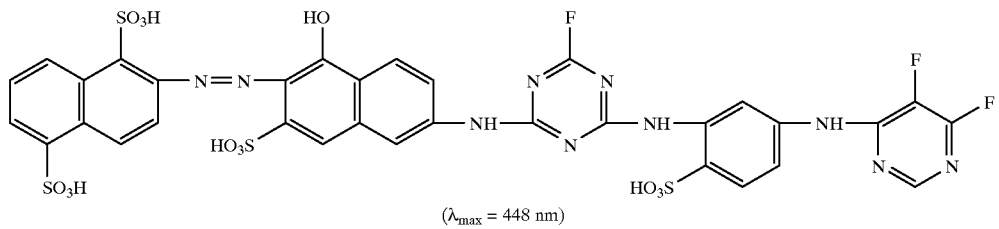

($\lambda_{max}$ = 448 nm)

and dyes the fiber materials mentioned in the description, such as, in particular, cotton, in brilliant orange color shades having very good wet fastnesses.

The dye according to the invention can likewise be prepared in the manner according to the invention by starting from the azo compound 7-(1',5'-disulfonaphth-2-yl)azo-3-amino-6-sulfo-8-naphthalene and reacting this with the 2-(2',4'-difluoro-1',3',5'-triazin-6'-yl)amino-4-(5',6'-difluoropyrimidin-4'-yl)aminobenzenesulfonic acid prepared according to section a) in an equivalent amount at a pH of between 7 and 7.5 and a temperature between 15 and 20° C.

EXAMPLE 9 a) 23.6 parts of monosodium 2-aminonaphthalene-6,8-disulfonate are stirred into a mixture of 150 parts of water, 30 parts of ice and 20 parts of concentrated aqueous hydrochloric acid and diazotized at a temperature between 5 and 10° C. with slow addition of 17 parts by volume of an aqueous 30% strength sodium nitrite solution. After the diazotization reaction is complete, excess nitrous acid is destroyed in a customary manner using amidosulfonic acid. The suspension obtained is stirred in the course of approximately 30 minutes into a neutral solution of 13.5 parts of N-(3-aminophenyl)acetamide hydrochloride, 50 parts of water, 50 parts of ice and approximately 30 parts by volume of a 10% strength aqueous sodium hydroxide solution while maintaining a pH of between 6.0 and 6.5 by means of 20% strength aqueous potassium hydrogencarbonate solution and a temperature of below 10° C. The mixture is additionally stirred for approximately 30 minutes while maintaining these reaction conditions.

b) In a separate batch, 15.2 parts of monosodium 2,4-diaminobenzenesulfonate are stirred in 100 parts of water and the sodium salt is dissolved at a pH of 6 using 10% strength aqueous lithium hydroxide solution. The solution obtained is warmed to 40° C. and treated with 12 parts of 4,5,6-trifluoropyrimidine with stirring. The condensation reaction is completed while maintaining a pH of between 5.8 and 6.2 by means of an aqueous lithium hydroxide solution and a temperature of 40° C. during the course of two hours. The precipitated lithium fluoride is removed by filtration, the filtrate is treated with approximately 200 parts of ice and the primary condensation product in solution is reacted at 0° C. with 10 parts of trifluoro-s-triazine while maintaining a pH of between 6 and 6.5 by means of 10% strength aqueous lithium hydroxide solution. The batch is additionally stirred for approximately 15 minutes and the solution obtained is then slowly added at 0° C. with stirring to the solution of the azo compound prepared according to a). The reaction is initially carried out at approximately 10° C. while maintaining a pH of between 7.0 and 7.2 by means of 20% strength aqueous sodium carbonate solution and the batch is then warmed to 25° C. in the course of 3 hours while maintaining this pH range. The batch is then again stirred for one hour and clarified in a customary manner by means of kieselguhr and filtration.

The azo dye according to the invention of the formula (written in the form of the free acid)

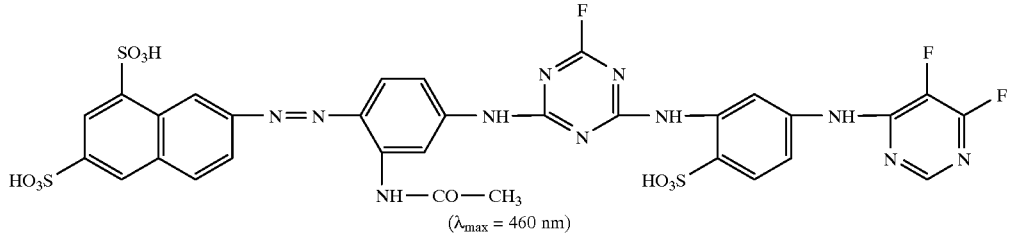

($\lambda_{max}$ = 460 nm)

is isolated as an alkali metal salt (lithium/sodium salt) by salting out by means of sodium chloride. It has very good fiber-reactive dyeing properties and yields, for example on cotton, intense golden yellow, highly fast dyeings in the application processes customary in the art for fiber-reactive dyes.

EXAMPLES 10 TO 97

In the following Tabular Examples, further dyes according to the invention corresponding to the formula (A)

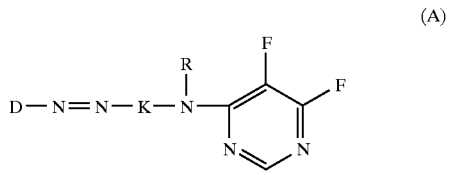

(A)

are described with the aid of their components (the radical D of the diazo component D—NH$_2$, the radical —K—N(R)— of the amino group-containing coupling component of the formula H—K—N(R)H and 4,5,6-trifluoropyrimidine). They can be prepared in one of the procedures according to the invention, for example analogously to one of the above Working Examples. They have very good fiber-reactive dyeing properties and dye, for example, cotton in the color shade indicated in the respective Tabular Example in a high color intensity and good fastnesses.

| | | Dye of the formula (A) | |
|---|---|---|---|
| Ex. | Radical D- | Radical —K—N(R)- | Color shade |
| 10 | 2-methoxy-5-methyl-4-(β-sulfatoethylsulfonyl)phenyl | 3,6-disulfo-8-hydroxy-naphth-7,1-ylen-1-amino | red-tinged violet (561) |
| 11 | 2-bromo-4-(β-sulfato-ethylsulfonyl)phenyl | ditto | blue-tinged red (537) |
| 12 | 2-sulfo-4-(β-sulfato-ethylsulfonyl)-phenyl | ditto | blue-tinged red (525) |
| 13 | 3-(β-sulfatoethylsulfonyl)-phenyl | ditto | blue-tinged red (537) |
| 14 | 4-methoxy-3-(β-sulfato-ethylsulfonyl)phenyl | ditto | blue-tinged red (557) |
| 15 | 2-methoxy-5-(β-sulfato-ethylsulfonyl)phenyl | ditto | blue-tinged red (558) |
| 16 | 4-chloro-3-(β-sulfato-ethylsulfonyl)phenyl | ditto | blue-tinged red (540) |
| 17 | 2-carboxy-5-(β-sulfato-ethylsulfonyl)phenyl | ditto | blue-tinged red (550) |
| 18 | 3-sulfophenyl | ditto | red (534) |
| 19 | 4-sulfophenyl | ditto | red (532) |
| 20 | 2-sulfo-4-methylphenyl | ditto | blue-tinged red (542) |
| 21 | 2,5-disulfophenyl | ditto | red (535) |
| 22 | 1-sulfo-6-(β-sulfato-ethylsulfonyl)naphth-2-yl | ditto | blue-tinged red (538) |
| 23 | 6-sulfo-8-(β-sulfato-ethylsulfonyl)naphth-2-yl | ditto | red (527) |
| 24 | 1-sulfo-6-carboxynaphth-2-yl | ditto | blue-tinged red (538) |
| 25 | 2-sulfophenyl | ditto | red (532) |
| 26 | 2-sulfo-4-methylphenyl | 6-sulfo-8-hydroxynaphth-7,3-ylen-3-amino | yellow-tinged red (500) |
| 27 | 2,5-disulfo-4-methoxyphenyl | 6-sulfo-8-hydroxynaphth-7,3-ylen-3-(N-methyl)-amino | yellow-tinged red (496) |
| 28 | 1,5-disulfonaphth-2-yl | 6-sulfo-8-hydroxynaphth-7,3-ylen-3-amino | orange (482) |
| 29 | ditto | 4,6-disulfo-8-hydroxy-7,1-ylen-1-amino | red (535) |
| 30 | 2-sulfophenyl | ditto | red (530) |
| 31 | 3,6,8-trisulfonaphth-2-yl | 3-ureidophen-4,1-ylen-1-amino | red-tinged yellow (415) |
| 32 | 3,7-disulfonaphth-2-yl | ditto | yellow (418) |
| 33 | ditto | 3-acetylaminophen-4,1-ylen-1-amino | yellow (406) |
| 34 | 4,6,8-trisulfonaphth-2-yl | ditto | yellow (403) |
| 35 | 4-sulfophenyl | 3-ureidophen-4,1-ylen-1-amino | yellow (384) |
| 36 | 2,4-disulfophenyl | ditto | yellow (401) |
| 37 | 1,5-disulfonaphth-2-yl | ditto | yellow (400) |
| 38 | 2-sulfo-4-methoxyphenyl | 6-sulfo-8-hydroxynaphth-7,3-ylen-3-amino | yellow-tinged red (500) |
| 39 | 2-sulfo-4-methoxyphenyl | 3,6-disulfo-8-hydroxy-naphth-7,1-ylen-1-amino | blue-tinged red |
| 40 | 5,7-disulfonaphth-2-yl | 4,1-phenylene-1-(N-ethyl)amino | yellow (415) |
| 41 | ditto | 2-methylphen-4,1-ylen-1-amino | yellow (418) |
| 42 | ditto | 2,5-dimethylphen-4,1-ylen-1-amino | yellow (420) |
| 43 | ditto | 3-methylphen-4,1-ylen-1-(N-ethyl)amino | yellow (419) |
| 44 | 2,5-disulfo-4-methoxyphenyl | 3,6-disulfo-8-hydroxy-naphth-7,1-ylen-1-amino | blue-tinged red (560) |
| 45 | 2-carboxyphenyl | ditto | blue-tinged red (545) |
| 46 | 1,5-disulfonaphth-2-yl | ditto | blue-tinged red (540) |
| 47 | 4-(4',6',8'-trisulfonaphth-2'-yl)-azo-6-sulfonaphth-1-yl | 3-methylphen-4,1-ylen-1-amino | red-brown (448) |

-continued

Dye of the formula (A)

| Ex. | Radical D- | Radical —K—N(R)- | Color shade |
|---|---|---|---|
| 48 | 2,5-dimethoxy-4-(β-sulfato-ethylsulfonyl)phenyl | ditto | red-tinged violet (574) |
| 49 | 2,5-disulfo-4-methoxyphenyl | 3,6-disulfo-8-hydroxy-naphth-7,1-ylen-1-amino | blue-tinged red (560) |
| 50 | 2-carboxyphenyl | ditto | blue-tinged red (545) |
| 51 | 1,5-disulfonaphth-2-yl | ditto | blue-tinged red (540) |
| 52 | 4-(1',5'-disulfonaphth-2'-yl)-azo-6-sulfonaphth-1-yl | 6-sulfonaphth-4,1-ylen-1-amino | red-brown (460) |
| 53 | ditto | 8-sulfonaphth-4,1-ylen-1-amino | red-brown (458) |
| 54 | 4-[4'-(β-sulfatoethylsulfonyl)-phenyl]-azo-6-sulfonaphth-1-yl | ditto | red-brown (457) |
| 55 | 4-(4',8'-disulfonaphth-2'-yl)-azo-(6,7)-sulfonaphth-1-yl | 3-methylphen-4,1-ylen-1-amino | red-brown (452) |
| 56 | ditto | 8-sulfonaphth-4,1-ylen-1-amino | red-brown (460) |
| 57 | 4-(2',5'-disulfophenyl)azo-(6,7)-sulfonaphth-1-yl | 3-ureidophen-4,1-ylen-1-amino | red-brown (455) |
| 58 | 4-(2'-sulfo-4'-methoxy-phenyl)azo-(6,7)-sulfonaphth-1-yl | 3-acetylaminophen-4,1-ylen-1-amino | red-brown |
| 59 | 4-(2'-sulfo-4'-methylphenyl)-azo-6-sulfonaphth-1-yl | 2,5-dimethylphen-4,1-ylen-1-amino | red-brown |
| 60 | ditto | 3-methylphen-4,1-ylen-1-amino | red-brown |
| 61 | 2-carboxyphenyl | 4,6-disulfo-1-(benzoyl-amino)-8-hydroxy-7,4'-ylen-4'-amino | blue-tinged red (544) |
| 62 | 1,5-disulfonaphth-2-yl | ditto | blue-tinged red (540) |
| 63 | 2-sulfophenyl | ditto | red (531) |
| 64 | 2-sulfo-4-methylphenyl | ditto | scarlet red (496) |
| 65 | 2,5-disulfo-4-methoxyphenyl | ditto | scarlet red (500) |
| 66 | 1,5-disulfonaphth-2-yl | ditto | orange-red (485) |
| 67 | 1,5-disulfonaphth-2-yl | 4,6-disulfo-8-hydroxy-naphth-7,1-ylen-1-amino | red |
| 68 | 1-sulfonaphth-2-yl | ditto | red |
| 69 | 4-(1',5'-disulfonaphth-2'-yl)-azo-6-sulfonaphth-1-yl | 6-sulfonaphth-4,1-ylen-1-amino | red-brown (460) |
| 70 | ditto | 8-sulfonaphth-4,1-ylen-1-amino | red-brown (458) |
| 71 | 4-[4'-(β-sulfatoethylsulfonyl)-phenyl]-azo-6-sulfonaphth-1-yl | ditto | red-brown (457) |
| 72 | 4-(4',8'-Disulfonaphth-2'-yl)-azo-(6,7)-sulfonaphth-yl | 3-Methylphen-4,1-ylen-1-amino | red-brown (452) |
| 73 | ditto | 8-sulfonaphth-4,1-ylen-1-amino | red-brown (460) |
| 74 | 4-(2',5'-disulfophenyl)azo-6,7-sulfonaphth-1-yl | 3-ureidophen-4,1-ylen-1-amino | red-brown (455) |
| 75 | 4-(2'-sulfo-4'-methoxyphenyl)-azo-(6,7-sulfo)naphth-1-yl | 3-acetylaminophen-4,1-ylen-1-amino | red-brown |
| 76 | 4-(2'-sulfo-4'-methylphenyl)-azo-6-sulfonaphth-1-yl | 2,5-dimethylphen-4,1-ylen-1-amino | red-brown |
| 77 | ditto | 3-methylphen-4,1-ylen-1-amino | red-brown |
| 78 | 4,8-disulfonaphth-2-yl | 3-acetylaminophen-4,1-ylen-1-amino | yellow (422) |
| 79 | 4-(4',8'-disulfonaphth-2'-yl)-azo-6-sulfonaphth-1-yl | 8-sulfonaphth-4,1-ylen-1-amino | red-brown (462) |
| 80 | 2-sulfo-4-methoxyphenyl | 6-sulfo-8-hydroxynaph-7,3-ylen-3-amino | scarlet red (503) |
| 81 | 2-sulfophenyl | ditto | orange (490) |
| 82 | 1,5,7-trisulfonaphth-2-yl | 3,6-disulfo-8-hydroxy-naphth-7,1-ylen-1-amino | blue-tinged red (542) |
| 83 | 4,8-disulfonaphth-2-yl | ditto | blue-tinged red (542) |
| 84 | 3,6,8-trisulfonaphth-2-yl | ditto | blue-tinged red (540) |

-continued

| Dye of the formula (A) | | | |
|---|---|---|---|
| Ex. | Radical D- | Radical —K—N(R)- | Color shade |
| 85 | ditto | 3-ureidophen-4,1-ylen-1-amino | red-tinged yellow (419) |
| 86 | ditto | ditto | red-tinged yellow (419) |
| 87 | 4,8-disulfonaphth-2-yl | 3-acetylaminophen-4,1-ylen-1-amino | yellow (394) |
| 88 | ditto | ditto | yellow (394) |
| 89 | 2-sulfophenyl | 3,6-disulfo-8-hydroxynaphth-7,1-ylen-1-amino | red (532) |
| 90 | ditto | ditto | red (532) |
| 91 | 4-(4'-sulfophenyl)-azo-2-sulfophenyl | 6-sulfo-8-hydroxynaphth-7,3-ylen-3-amino | scarlet (512) |
| 92 | ditto | 4,6-disulfo-8-hydroxynaphth-7,3-ylen-3-amino | scarlet (506) |
| 93 | 1,5-disulfonaphth-2-yl | ditto | orange (490) |
| 94 | 2-sulfo-4-methylphenyl | ditto | scarlet (500) |
| 95 | 2-sulfo-4-methoxyphenyl | ditto | scarlet (500) |
| 96 | 4-(β-sulfatoethylsulfonyl)phenyl | 3,6-disulfo-8-hydroxynaphth-7,1-ylen-1-amino | blue-tinged red (538) |
| 97 | 2,5-dimethoxy-4-(β-sulfatoethylsulfonyl)phenyl | ditto | red-tinged violet (570) |

EXAMPLE 98

680 parts of a neutral aqueous 0° C. solution of 81 parts of the disazo compound 2-[4'-(β'-sulfatoethylsulfonyl) phenyl]azo-7-(2"-sulfo-5"-aminophenyl)azo-3,6-disulfo-1-amino-8-hydroxynaphthalene (which can be prepared in a customary manner by the coupling reaction of 3,6-disulfo-1-amino-8-naphthol with the diazonium salt of 4-(β-sulfatoethylsulfonyl)aniline in the strongly acidic range and a subsequent coupling reaction of the monoazo compound obtained with the monodiazonium salt of 1,3-diaminobenzene-6-sulfonic acid in the weakly acidic to neutral range) in 600 parts of water are slowly treated with 15 parts of 4,5,6-trifluoropyrimidine while maintaining a pH of between 6 and 7 and a temperature of 40° C.

After completion of the reaction and addition of 1 part of disodium hydrogenphosphate and 3 parts of sodium dihydrogenphosphate, the disazo dye according to the invention is isolated by evaporation of the synthesis solution, such as, for example, by spray-drying. The alkali metal salt (sodium salt) of the compound of the formula

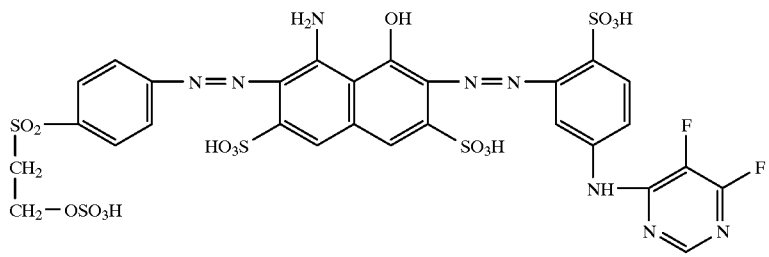

($\lambda_{max}$ = 595 nm).

is obtained.

The disazo dye according to the invention has very good fiber-reactive dye properties and dyes, for example, cellulose fiber materials, such as cotton, depending on the amount of dye used, in pale blue to navy blue shades having good fastness properties, of which, in particular, the good chlorine bath water fastnesses can be emphasized, by the dyeing and printing processes customary in the art for fiber-reactive dyes.

EXAMPLE 99 a) 13.4 parts of 4,5,6-trifluoropyrimidine are added at 30 to 35° C. with good stirring to 200 parts of a neutral aqueous solution of 18.8 parts of 1,3-diaminobenzene-4-sulfonic acid, a pH of 6.5 being maintained by means of an aqueous sodium carbonate solution. After completion of the reaction, the compound 3-(5',6'-difluoropyrimidin-4'-yl)-6-sulfoaniline obtained is diazotized in a customary manner by means of 28 parts of an aqueous concentrated hydrochloric acid after addition of ice and 7 parts of sodium nitrite to the synthesis solution.

b) The diazonium salt suspension obtained is added at 10 to 15° C. and a pH of 6.0 to 6.5 to approximately 600 parts of an aqueous solution of 53 parts of the compound 1-amino-8-hydroxy-3,6-disulfo-2-[4'-(β-sulfatoethylsulfonyl)phenyl] azonaphthalene and the coupling reaction is completed while maintaining this pH.

The disazo dye according to the invention of the formula (written in the form of the free acid)

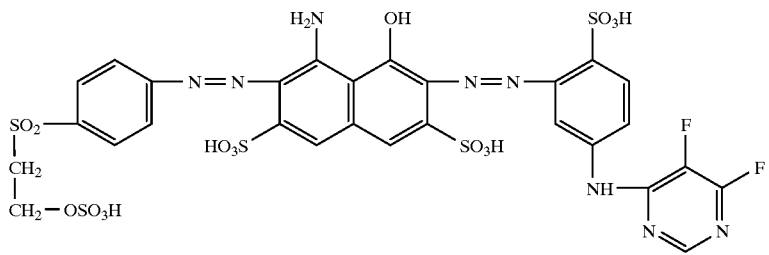

($\lambda_{max}$ = 595 nm)

is isolated as an alkali metal salt (sodium salt) in the form of an electrolyte-containing black powder. It exhibits very good dyeing properties and yields navy blue dyeings and prints having good fastness properties, of which, in particular, the chlorine bath water fastness can be emphasized, on the materials mentioned in the description, such as, in particular, cellulose fiber materials.

EXAMPLE 100

For the preparation of the azo dye according to the invention of the formula (written in the form of the free acid)

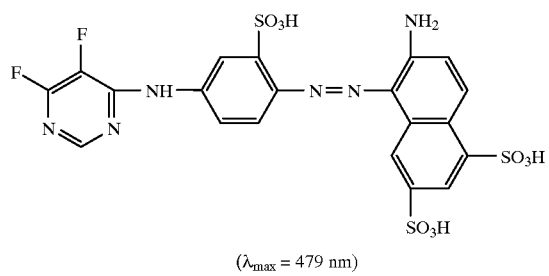

($\lambda_{max}$ = 479 nm)

the diazonium salt suspension prepared according to Example 99a) is used as a starting material and is stirred at 0 to 5° C. into a solution of 30.3 parts of 2-aminonaphthalene-5,7-disulfonic acid in 570 parts of water. The coupling reaction is carried out at a temperature of 20° C. and a pH of 4.

The dye according to the invention obtained is isolated in the customary manner, for example by salting out with sodium chloride. It exhibits very good fiber-reactive dyeing properties and yields intense orange dyeing having good fastnesses, for example on cellulose fiber materials.

EXAMPLES 101 TO 133

In the following Tabular Examples, further azo dyes according to the invention corresponding to the formula (B)

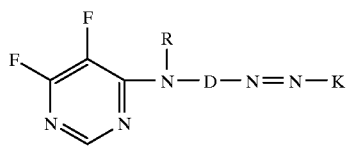

(B)

are described with the aid of the components evident therefrom. They can be prepared in one of the procedures according to the invention, for example analogously to the details of Examples 99 and 100, by reaction of the starting compounds evident from the formula radicals. They have very good fiber-reactive dyeing properties and yield intense dyeings and prints having the color shade indicated in the respective Tabular Example for cotton on the fiber materials mentioned in the description, such as, in particular cotton, by the application and fixing processes customary for fiber-reactive dyes.

| | | Dye of the formula (B) | |
|---|---|---|---|
| Ex. | Radical —N(R)-D- | Radical K | Color shade |
| 101 | 6-sulfophen-1,3-ylen-3-amino | 2-[3'-(β-sulfatoethylsulfonyl)-phenyl]azo-4,6-disulfo-1-amino-8-hydroxynaphth-7-yl | navy blue (594) |
| 102 | ditto | 2-[3'-(β-sulfatoethylsulfonyl)-6'-methoxyphenyl]azo-3,6-disulfo-1-amino-8-hydroxynaphth-7-yl | navy blue (595) |
| 103 | 2-sulfophen-1,4-ylen-4-amino | 2-amino-5,7-disulfonaphth-1-yl | orange (479) |
| 104 | 6-sulfophen-1,3-ylen-3-amino | N-ethyl-3-aminocarbonyl-4-methyl-6-hydroxypyridin-2-on-5-yl | green-tinged yellow(390) |
| 105 | ditto | 1,4-dimethyl-3-sulfo-6-hydroxypyridin-2-on-5-yl | green-tinged yellow(410) |
| 106 | 2-sulfophen-1,4-ylen-4-amino | N-ethyl-3-cyano-4-methyl-6-hydroxypyridin-2-on-5-yl | red-tinged yellow(442) |
| 107 | ditto | 1-(4'-sulfophenyl)-3-carboxy-pyrazol-5-on-4-yl | yellow(417) |
| 108 | ditto | 1-(4'-sulfophenyl)-3-methyl-pyrazol- | green-tinged |

-continued

Dye of the formula (B)

| Ex. | Radical —N(R)-D- | Radical K | Color shade |
|---|---|---|---|
| 109 | 6-sulfophen-1,3-ylen-3-amino | 5-on-4-yl<br>1-[4'-(β-sulfatoethylsulfonyl)phenyl]-3-methyl-pyrazol-5-on-4-yl | yellow(410)<br>green-tinged yellow(398) |
| 110 | 2-sulfophen-1,4-ylen-4-amino | 2-[4'-(β-sulfatoethylsulfonyl)-phenyl]azo-3,6-disulfo-1-amino-8-hydroxynaphth-7-yl | navy blue (600) |
| 111 | 1,4-phenylene-4-amino | ditto | navy blue (602) |
| 112 | 2,5-disulfophen-1,4-ylen-4-amino | ditto | navy blue (598) |
| 113 | 1,3-phenylene-3-amino | ditto | navy blue (596) |
| 114 | 2,5-disulfophen-1,4-ylen-4-amino | ditto | navy blue (598) |
| 115 | 1,3-phenylene-3-amino | ditto | navy blue (597) |
| 116 | 1-sulfonaphth-2,4-ylen-4-amino | ditto | navy blue (596) |
| 117 | 1-sulfonaphth-2,5-ylen-5-amino | ditto | navy blue (598) |
| 118 | 2,5-disulfophen-1,4-ylen-4-amino | 2-amino-5,7-disulfonaphth-1-yl | orange (487) |
| 119 | 6-sulfophen-1,3-ylen-3-amino | N-ethyl-3-aminocarbonyl-4-methyl-6-hydroxypyridin-2-on-5-yl | yellow (424) |
| 120 | ditto | 1,4-dimethyl-3-sulfo-6-hydroxypyridin-2-on-5-yl | green-tinged yellow(410) |
| 121 | 2-sulfophen-1,4-ylen-4-amino | N-ethyl-3-cyano-4-methyl-6-hydroxypyridin-2-on-5-yl | red-tinged yellow(442) |
| 122 | ditto | 1-(4'-sulfophenyl)-3-carboxy-pyrazol-5-on-4-yl | yellow(417) |
| 123 | ditto | 1-(4'-sulfophenyl)-3-methyl-pyrazol-5-on-4-yl | green-tinged yellow(410) |
| 124 | 6-sulfophen-1,3-ylen-3-amino | 1-[4'-(β-sulfatoethylsulfonyl)-phenyl]-3-methyl-pyrazol-5-on-4-yl | green-tinged yellow(398) |
| 125 | ditto | 2-(2',5'-disulfophenyl)azo-3,6-disulfo-1-amino-8-hydroxynaphth-7-yl | navy blue (600) |
| 126 | ditto | 2-(4'-sulfophenyl)azo-3,6-disulfo-1-amino-8-hydroxynaphth-7-yl | navy blue (597) |
| 127 | ditto | 3,6-disulfo-1-(N-benzoylamino)-8-hydroxynaphth-7-yl | red (537) |
| 128 | ditto | 4,6-disulfo-1-(N-benzoylamino)-8-hydroxynaphth-7-yl | scarlet |
| 129 | ditto | 3,6-disulfo-1-(N-acetylamino)-8-hydroxynaphth-7-yl | red (525) |
| 130 | 1-sulfonaphth-2,5-ylen-5-methyleneamino | 3,6-disulfo-1-(N-benzoylamino)-8-hydroxynaphth-7-yl | red (544) |
| 131 | ditto | 4,6-disulfo-1-(N-benzoylamino)-8-hydroxynaphth-7-yl | red (513) |
| 132 | 6-sulfophen-1,3-ylen-3-amino | 2-[4'-(β-sulfatoethylsulfonyl)-phenyl]azo-4,6-disulfo-1-amino-8-hydroxynaphth-7-yl | navy blue (594) |
| 133 | ditto | 2-[3'-(β-sulfatoethylsulfonyl)-phenyl]azo-3,6-disulfo-1-amino-8-hydroxynaphth-7-yl | navy blue (595) |

EXAMPLE 134

5.3 parts by volume of 4,5,6-trifluoropyrimidine are stirred into 560 parts of an aqueous suspension of 54.5 parts of N-(2-carboxy-5-sulfophenyl)-N'-(2'-hydroxy-3'-amino-5'-sulfophenyl)-ms-phenylformazan while maintaining a pH of 7.0 to 7.5 at 25° C. and the reaction mixture is then stirred in this pH range at a temperature of 40° C. for several hours further. The synthesis solution is then clarified in a customary manner by means of active carbon and a filtering aid.

The copper formazan dye according to the invention of the formula (written in the form of the free acid)

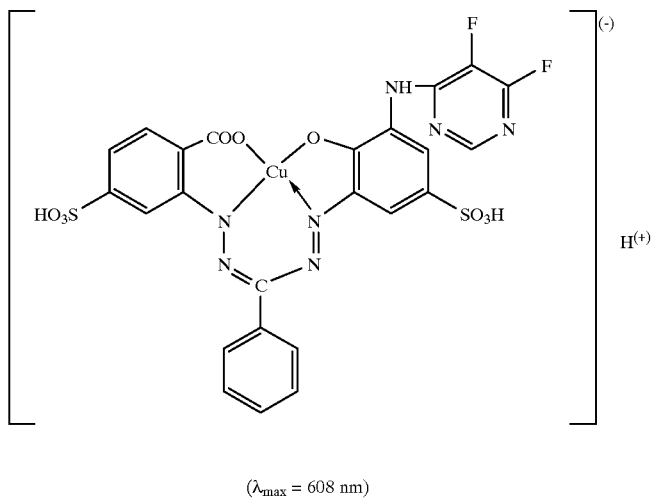

(λ<sub>max</sub> = 608 nm)

is salted out of the synthesis solution by means of sodium chloride. It dyes, for example cotton in intense, blue shades with good fastnesses by the dyeing procedures customary in the art for fiber-reactive dyes.

EXAMPLE 135

A neutral solution of 26.5 parts of 1-amino-4-(2',4',6'-trimethyl-3'-aminophenylamino)anthraquinone-2,5'-disulfonic acid is treated with 7.1 parts of 4,5,6-trifluoropyrimidine with good stirring at 40 to 50° C. and while maintaining a pH of 6 to 7. The mixture is additionally stirred for some time while maintaining the pH from 6 to 7 until the reaction is complete and the anthraquinone dye according to the invention of the formula (written in the form of the free acid)

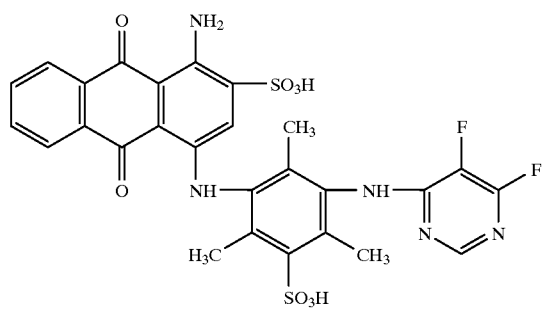

is then isolated by salting out from the synthesis solution by means of potassium chloride. It exhibits very good fiber-reactive dyeing properties and dyes the materials mentioned in the description, such as, for example, cellulose fiber materials, in brilliant blue shades having good fastness properties.

EXAMPLE 136

15.4 parts of 4,5,6-trifluoropyrimidine are stirred into a neutral solution of 41.9 parts of 1-amino-4-(3'-amino-2'-methyl-5'-sulfophenylamino)-anthraquinone in 500 parts of water at 25° C. and the pH here is kept at 6 to 7 by means of aqueous sodium carbonate solution. The reaction batch is additionally stirred for some time at 40 to 50° C. while maintaining this pH range and the anthraquinone dye according to the invention is isolated by salting out by means of sodium chloride, filtration and washing with 10% strength sodium chloride solution in a customary manner. It has, written in the form of the free acid, the formula

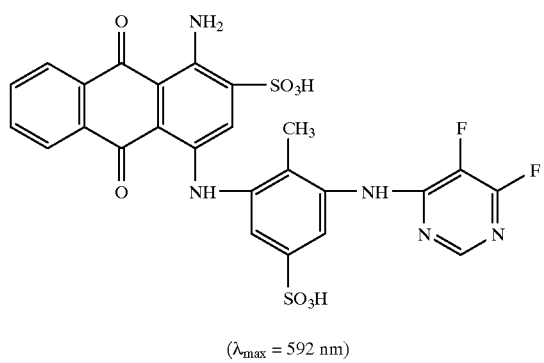

(λ<sub>max</sub> = 592 nm)

and dyes the fiber materials mentioned in the description, such as, in particular, cotton, in a neutral blue shade by the dyeing and printing processes customary for fiber-reactive dyes.

EXAMPLE 137

The process used for the preparation of the anthraquinone dye according to the invention of the formula (written in the form of the free acid)

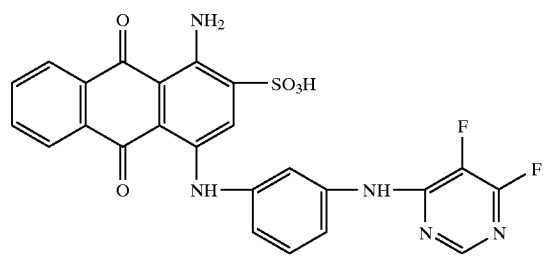

according to the procedure of Example 134 is used with the exception that instead of the aminoanthraquinone starting compound indicated there 19.8 parts of 1-amino-4-(3'-aminophenylamino)anthraquinone-2-sulfonic acid are used as starting material.

The anthraquinone dye according to the invention likewise exhibits very good fiber-reactive dyeing properties and dyes, for example, cotton in fast, intense blue shades by the dyeing and printing processes customary in the art for fiber-reactive dyes.

EXAMPLE 138

The process for the preparation of the anthraquinone dye according to the invention according to the procedure of Example 135 is used with the exception that instead of the aminoanthraquinone starting compound indicated there the compound 1-amino-4-[4'-(N-methyl)aminomethylene-2'-sulfophenyl]aminoanthraquinone-2-sulfonic acid in equivalent amount is used as a starting material.

The anthraquinone dye according to the invention likewise exhibits very good fiber-reactive dyeing properties and dyes, for example, cotton in fast, intense blue shades by the dyeing and printing processes customary in the art for fiber-reactive dyes.

EXAMPLE 139 a) 18.8 parts of 2,4-diaminobenzenesulfonic acid are dissolved in 80 parts of water by neutralization with 10% strength aqueous sodium hydroxide solution and reacted at 25 to 40° C. with 15.4 parts of 4,5,6-trifluoropyrimidine at a pH of between 5.5 and 6.0. After completion of the reaction, 19.3 parts of cyanuric chloride are added and the batch is additionally stirred at 20 to 25° C. and at a pH of 5.0. As soon as a diazotizable amino group is no longer detectable, the reaction is terminated. A solution or viscous suspension of the compound 2-(2',4'-dichloro-1',3',5'-triazin-6'-yl)amino-4-(5",6"-difluoropyrimidin-4"-yl) aminobenzenesulfonic acid is obtained as the sodium salt.

b) 46.5 parts of 1-amino-(2'-aminomethyl-4'-methyl-6'-sulfophenylamino)anthraquinone-2-sulfonic acid are dissolved in 300 parts of water with addition of 10 parts of caprolactam at a pH of 7 and a temperature of 70° C. After cooling the batch to room temperature, the solution prepared under a) is added and the batch is additionally stirred for several hours while maintaining a pH of 6.0 to 6.5 by means of aqueous 10% strength sodium carbonate or lithium hydroxide solution. After completion of the reaction, the anthraquinone dye according to the invention is salted out of the solution obtained by means of sodium chloride, filtered off with suction, washed with 20% strength aqueous sodium chloride solution and dried under reduced pressure at 50° C.

The dye according to the invention has, written in the form of the free acid, the formula

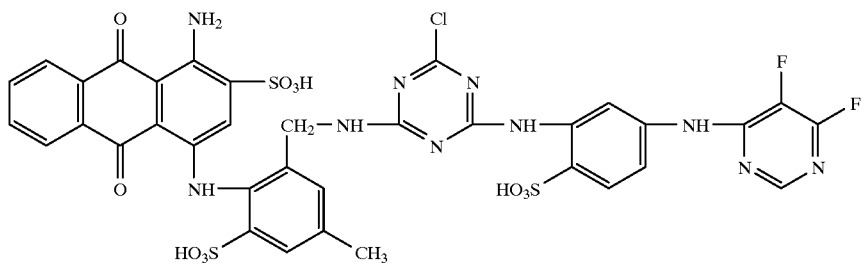

($\lambda_{max}$ = 621 u. 583 nm)

It dyes, for example, cotton and cellulose in brilliant red-tinged blue shades with a high fixing yield and outstanding wet fastnesses by the printing and dyeing processes known in the art.

EXAMPLE 140

For the preparation of an anthraquinone dye according to the invention, the process according to the procedure of Example 139 is used, but instead of cyanuric chloride, 14.2 parts of cyanuric fluoride are employed and reaction thereof is carried out at a pH of 4.5 to 5.0 and a temperature between 0 and 5° C. and the reaction of the difluorotriazinylamino compound thus obtained with the anthraquinone starting compound is carried out at 0 to 10° C. and a pH of 6.0.

The anthraquinone dye according to the invention of the formula (written in the form of the free acid)

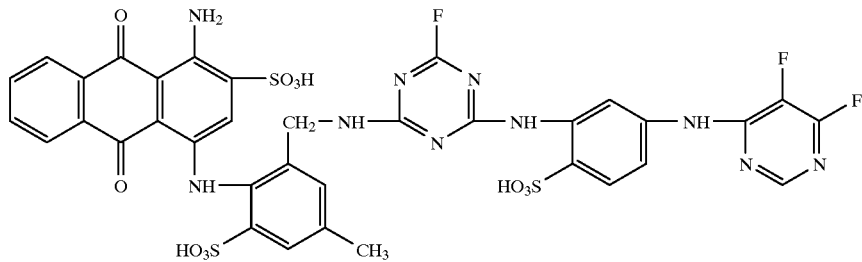

($\lambda_{max}$ = 621 u. 583 nm)

is obtained, which dyes, for example, cellulose fiber materials, such as cotton fabric, in high fixing yields and brilliant blue shades with good fastnesses by the application processes customary in the art for fiber-reactive dyes.

EXAMPLE 141

For the preparation of an anthraquinone dye according to the invention, the process according to the procedure of Example 140 is used by stirring the aqueous solution or suspension of the condensation product of 18.8 parts of 2,4-diaminobenzenesulfonic acid, 15.4 parts of 4,5,6-trifluoropyrimidine and 14.2 parts of cyanuric fluoride prepared according to Example 140 into a neutral solution of 41.9 parts of 1-amino-4-(3'-amino-2'-methyl-5'-sulfophenylamino)anthraquinone-2-sulfonic acid in 500 parts of water at 10 to 15° C. and carrying out the reaction while maintaining a pH of 5.5 to 6.0 by means of 10% strength aqueous sodium carbonate solution.

The anthraquinone dye according to the invention of the formula (written in the form of the free acid)

is salted out in a customary manner by means of sodium chloride, filtered off with suction and washed with 10% strength aqueous sodium chloride solution and dried. It dyes, for example, cotton in neutral blue shades by the customary dyeing processes for fiber-reactive dyes.

EXAMPLE 142

25 parts of 4,5,6-trifluoropyrimidine are added with good stirring to a neutral solution of 65 parts of the starting compound 1,6-disulfo-2,7-di-(γ-aminopropylamino)-5,10-dichlorotriphendioxazine in 500 parts of water at 40° C. and the pH is maintained here at approximately 6 by means of an aqueous 2N sodium hydroxide solution. The triphendioxazine dye according to the invention obtained is isolated from the synthesis solution in a customary manner by salting out with sodium chloride. It has, written in the form of the free acid, the formula

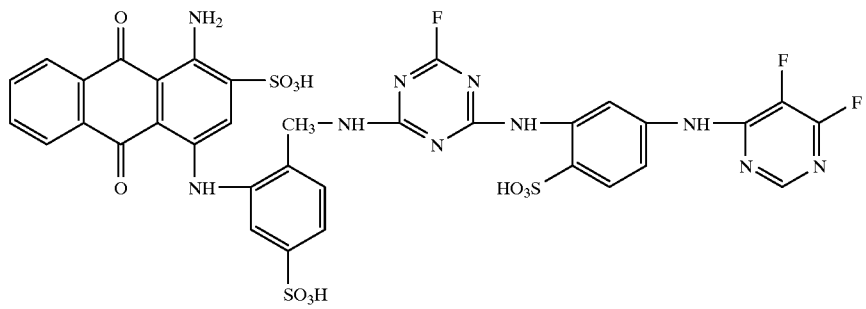

($\lambda_{max}$ = 611 nm)

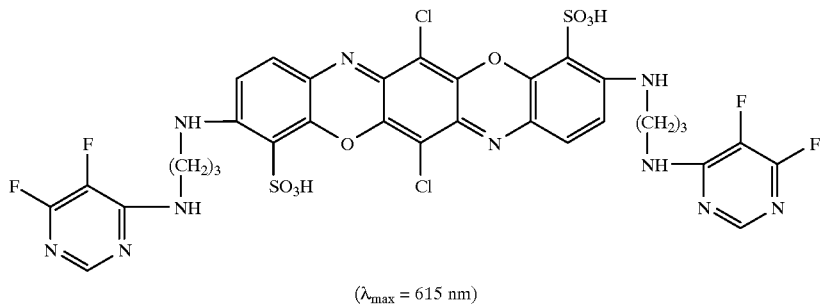

($\lambda_{max}$ = 615 nm)

and dyes the fiber materials mentioned in the description, such as, in particular, cellulose fiber materials, in intense, blue shades having good fastness properties by the application and fixing processes customary in the art for fiber-reactive dyes.

EXAMPLE 143

For the preparation of a triphendioxazine dye according to the invention, the process according to the details of Example 137 is used, but instead of the starting compound indicated there the compound 1,6-disulfo-2,7-di-(β-aminoethylamino)-5,10-dichlorotriphendioxazine is employed in an equivalent amount. The dye likewise exhibits very good fiber-reactive dyeing properties and dyes, for example, cotton in blue shades. In aqueous solution, it has an absorption maximum at 614 nm.

EXAMPLE 144

A neutral solution of 50.3 parts of the compound 3-(m-aminophenylaminosulfonyl)copper phthalocyanine-3',3'', 3'''-trisulfonic acid in 500 parts of water is treated with 5.2 parts of 4,5,6-trifluoropyrimidine at 35° C. in the course of approximately 30 minutes while maintaining a pH of 6 to 7. The mixture is additionally stirred for some time while maintaining these process conditions and the copper phthalocyanine dye according to the invention of the formula (written in the form of the free acid)

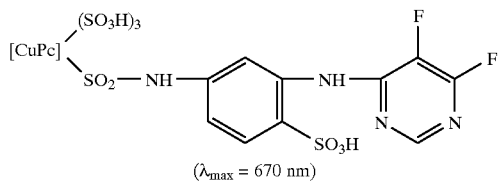

($\lambda_{max}$ = 670 nm)

is then isolated from the synthesis solution by salting out with sodium chloride. It dyes, for example, cotton, cellulose and regenerated cellulose in intense, turquoise blue, fast shades.

EXAMPLE 145

302 parts of 2-bromo-1-aminonaphthalene-4-sulfonic acid are dissolved in 2000 parts of water, diazotized in a customary manner and allowed to flow into a suspension of 467.5 parts of 6-(4',5'-difluoropyrimidin-6'-yl)amino-4,8-disulfo-1-hydroxynaphthalene in 3500 parts of water with vigorous stirring, a pH range of between 7 and 8 simultaneously being maintained using a 20% strength aqueous sodium carbonate solution (approximately 800 parts).

The suspension of the red coupling product obtained is slowly treated with 275 parts of 2-aminobenzoic acid and then with 1380 parts of an 18% strength copper sulfate solution while maintaining a pH of between 7 and 8. The mixture is stirred additionally for a few hours, the reaction solution is filtered and the copper formazan dye according to the invention of the formula (written in the form of the free acid) is isolated by salting out as the alkali metal salt (sodium salt). The dye exhibits good dyeing properties and yields intense green dyeings and prints with very high fastnesses, for example on cellulose fiber materials, such as cotton.

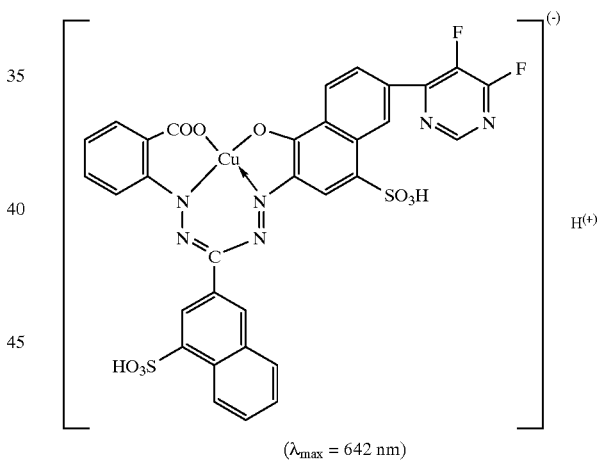

($\lambda_{max}$ = 642 nm)

EXAMPLE 146

20.3 parts of 3-amino-4-methoxybenzenesulfonic acid are diazotized in the customary manner. 15.3 parts of 3,4-dimethoxyaniline are added to the aqueous solution (approximately 200 parts) of the diazonium salt obtained, then a pH of less than 4 is set and the coupling reaction is completed in this acidic pH range. The precipitated azo compound is filtered off with suction. Approximately 80 parts of the water-containing paste of this amino azo compound obtained in this way are dissolved in 150 parts of water at a pH of approximately 8, and the amino azo compound is diazotized in a customary manner. The solution (approximately 500 parts) of the diazonium salt obtained is then introduced slowly with stirring into a neutral solution of 24 parts of 6-amino-1-hydroxynaphthalene-3-sulfonic acid in approximately 250 parts of water mixed with 150 parts by volume of a 20% strength aqueous sodium carbonate solution. After coupling is complete to give the disazo compound, the synthesis solution is treated with an ammoniacal aqueous copper sulfate solution which contains 25 parts of copper sulfate pentahydrate. The mixture is stirred at 95° C. for approximately 1 to 2 hours and the copper complex dye obtained is then salted out at room temperature by means of sodium chloride. The compound is isolated by filtering off with suction on a filter and the water-containing paste obtained is then dissolved in approximately 1000 parts of water and treated with 18 parts of 4,5,6-trifluoropyrimidine with good stirring. The mixture is additionally stirred for several hours at 25 to 35° C. while maintaining a pH of between 6 and 7 and the copper complex dye according to the invention of the formula (in the form of the free acid)

materials, by the dyeing and printing methods customary in the art for fiber-reactive dyes.

EXAMPLE 147

For the preparation of an azo dye according to the invention, the process according to the procedure of Example 8b) is used by first reacting 15.2 parts of monosodium 2,4-diaminobenzenesulfonate with 12 parts of 4,5,6-trifluoropyrimidine and then reacting the condensation product obtained with 10 parts of trifluoro-s-triazine. The solution of the secondary condensation product obtained is stirred at 0° C. and 30 parts of the azo compound 3-(2'-sulfo-5'-aminophenyl)-azo-4-methyl-5-sulfomethyl-N-methyl-2-hydroxypyridin-6-one are added in the form of a neutral aqueous solution while maintaining a pH of 6.0 to 6.2 and the reaction is carried out initially at approximately 10° C., then in the course of 3 hours with warming to 25° C.,

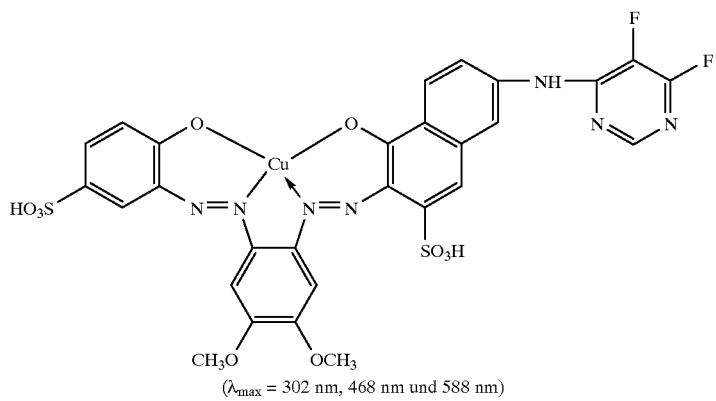

($\lambda_{max}$ = 302 nm, 468 nm und 588 nm)

is isolated by salting out by means of sodium chloride. The copper complex dye according to the invention exhibits very good dyeing properties and yields intense dyeings and prints in olive-colored shades on the fiber materials mentioned in the description, such as, in particular, cellulose fiber while maintaining a pH of 7.0 by means of 20% strength aqueous sodium carbonate solution.

The azo dye according to the invention is isolated in the customary manner by salting out with sodium chloride. It has, written in the form of the free acid, the formula

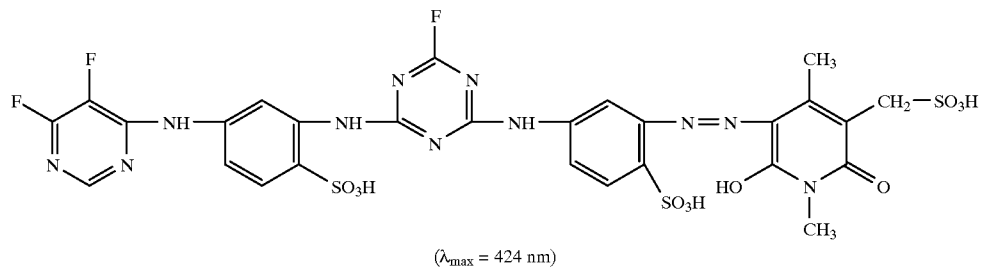

($\lambda_{max}$ = 424 nm)

and dyes, for example, cotton in brilliant green-tinged yellow shades by customary dyeing processes for fiber-reactive dyes.

We claim:

1. A dye corresponding to the formula (1)

in which:

Fb is the radical of a sulfo group containing monoazo dye of the formula (a-1)

in which $D^1$ is a substituted or unsubstituted phenyl or naphthyl radical, and $K^2$ is the substituted or unsubstituted residue of an aniline, aminonaphthalene, acetic acid (aminoaryl)amide or 1-aminophenyl-pyrazolone coupling component, or Fb is the radical of a sulfo group containing mono-or disazo dye conforming to the formulae (a-2) to (a-5)

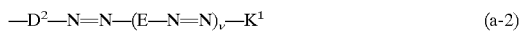
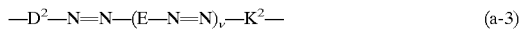
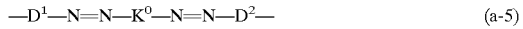

in which $D^1$ and $K^2$ are as previously defined, v is zero or 1, E is the substituted or unsubstituted phenyl or naphthyl radical of a middle component, $D^2$ is the substituted or unsubstituted diaminophenyl or diaminonaphthyl radical of a diazo component and $K^1$ is the substituted or unsubstituted phenyl, naphthyl, pyrazolone, 6-hydroxy-pyrid-2-one or acetoacetic acid arylamide radical of a coupling component, and $K^0$ is the radical of a bivalent coupling component having a substituted or unsubstituted naphthalene nucleus, provided that $D^1$, $D^2$, and $K^0$ together contain at least one sulfo group, or Fb is the radical of a sulfo-containing heavy metal complex mono-, dis- or trisazo, azomethine, phenazine, stilbene, triphenylmethane, xanthene, thioxanthine, nitroaryl, naphthoquinone, pyrenequinone, perylenetetracarbimide, formazan, phthalocyanine, or triphendioxazine dye, and with respect to formulae a-1 through a-5 and the said radicals $D^1$, $D^2$, $K^1$, $K^2$, $K^0$ and E, when substituted, these formulae or radicals contain, additionally to sulfo, at least one of the following substituents: alkyl of 1 to 4 carbon atoms; alkoxy of 1 to 4 carbon atoms; alkanoylamino of 2 to 5 carbon atoms; benzoylamino unsubstituted or substituted by substituents selected from sulfo, carboxy, methyl, ethyl, methoxy, ethoxy and chlorine; primary and mono- or disubstituted amino groups, where the substituents are selected from alkyl of 1 to 4 carbon atoms and phenyl, where the alkyls are unsubstituted or substituted by phenyl, sulfophenyl, hydroxy, sulfato, sulfo or carboxy and the phenyl groups are unsubstituted or substituted by substituents selected from chlorine, sulfo, carboxy, methyl and methoxy; alkoxycarbonyl having an alkyl of 1 to 4 carbon atoms; alkylsulfonyl of 1 to 4 carbon atoms; trifluoromethyl; nitro; cyano; halogen; carbamoyl; carbamoyl mono- or disubstituted by alkyl of 1 to 4 carbon atoms, where the alkyls are unsubstituted or substituted by hydroxy, sulfato, sulfo, carboxy, phenyl or sulfophenyl; sulfamoyl; sulfamoyl mono- or disubstituted by alkyl of 1 to 4 carbon atoms, the alkyls being unsubstituted or substituted by hydroxy, sulfato, sulfo, carboxy, phenyl or sulfophenyl; N-phenyl-N-alkylsulfamoyl having an alkyl of 1 to 4 carbon atoms, the alkyls being unsubstituted or substituted by hydroxy, sulfato, sulfo, carboxy, phenyl or sulfophenyl; N-phenylsulfamoyl; ureido; carboxy; sulfomethyl or from one to two fiber-reactive groups of the formula $Y-SO_2-W^0-$ in which $W^0$ is an alkylene of 1 to 4 carbon atoms or is $-N(CH_3-$ or $-N(C_2H_5)-$ or $-(C_2-C_4$-alkylene$)-NH-$ or a direct covalent bond and Y is vinyl or is $\beta$-sulfatoethyl, $\beta$-thiosulfatoethyl, $\beta$-phosphatoethyl, $\beta$-($C_2$-$C_5$-alkanoxyloxy) ethyl, $\beta$-benzoyloxyethyl, $\beta$-(sulfobenzoyloxy)ethyl, $\beta$-(p-toluenesulfonyloxy) ethyl or $\beta$-haloethyl;

n is the number 1, 2 or 3;

Z is a group of the formula (2)

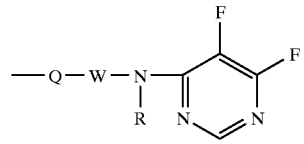

in which

Q is a covalent bond or a group of the formula

in which

R is hydrogen or alkyl of 1 to 4 carbon atoms optimally substituted by halogen, hydroxy, cyano, alkoxy of 1 to 4 carbon atoms, alkoxycarbonyl of 2 to 5 carbon atoms, carboxy, sulfamoyl, sulfo, sulfato or phosphato, W is a covalent bond of a bridging member, except that Q is necessarily a covalent bond if W is a covalent bond, and the amino groups $-N(R^A)-$ and $-N(R)-$ are bonded to one carbon atom of the bridging member W or to one carbon atom of a substituent of W, and R is hydrogen, or is alkyl of 1 to 4 carbon atoms optionally substituted by halogen, hydroxy, cyano, alkoxy of 1 to 4 carbon atoms, alkoxycarbonyl of 2 to 5 carbon atoms, carboxy, sulfamoyl, sulfo, sulfato or phosphate.

2. A dye as claimed in claim 1, wherein Fb is a radical of the formula 3g

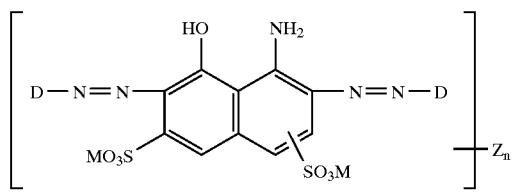

wherein
n is 1 or 2,
M is hydrogen, an alkali metal, or the molar equivalent of an alkaline earth metal,
Z is a group of the formula (2), and
D is defined in the same manner as $D^1$ if unsubstituted by Z, or is defined in the same manner as $D^2$ if substituted by Z.

3. A dye as claimed in claim 1, wherein Fb is the radical of a sulfo group-containing 1:1 copper complex mono- or disazo dye.

4. A dye as claimed in claim 1, wherein Fb is the radical of a sulfo group-containing copper formazan dye.

5. A dye as claimed in claim 1, wherein Fb is the radical of a sulfo group-containing aluminum phthalocyanine, copper phthalocyanine or nickel phthalocyanine dye.

6. A dye as claimed in claim 1, wherein Fb is the radical of a sulfo group-containing triphendioxazine dye.

7. A dye as claimed in claim 1, wherein Q is a direct bond or a group of the formula —N($R^A$)— wherein $R^A$ is defined as in claim 1.

8. A dye as claimed in claim 7, wherein $R^A$ is hydrogen.

9. A dye as claimed in claim 1, wherein n is the number 1.

10. A dye as claimed in claim 1, wherein R is hydrogen.

11. A dye as claimed in claim 1, wherein Q and W are both a covalent bond.

12. A dye as claimed in claim 1, wherein W is straight-chain or branched alkylene of 1 to 6 carbon atoms, or is alkylene of 2 to 8 carbon atoms which is interrupted by 1 or 2 hetero groups selected from the group consisting of —NH—, —N($R^A$)— with $R^A$ having the meaning mentioned in claim 1, —$SO_2$—, —CO—, —O—, —NH—$SO_2$—, —$SO_2$—NH—, —CO—NH— and —NH—CO—, or is optionally substituted arylene or optionally substituted arylenealkylene or is a radical containing two arylene radicals whose arylene radicals are bonded with one another via a covalent bond, a hetero group or an alkylene of 1 to 4 carbon atoms or an olefinic radical of 2 to 4 carbon atoms, or is the bivalent radical of a heterocyclic system to which optionally the bivalent radical of an optionally substituted phenylene-amino, phenylene-methylene-amino, naphthylene-amino or ($C_1$–$C_6$)-alkylene-amino radical is bonded.

13. A dye as claimed in claim 1, wherein W is a group of the formula (a)

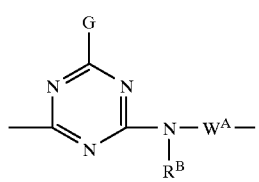

(a)

in which
G is fluorine, chlorine, bromine, cyanoamino, optionally substituted amino, hydroxy, alkoxy of 1 to 4 carbon atoms, phenoxy, phenoxy optionally substituted by 1 or 2 substituents selected from the group consisting of sulfo, carboxy, methyl, ethyl, methoxy and ethoxy, or is alkylthio of 1 to 4 carbon atoms, $R^B$ is hydrogen, or alkyl of 1 to 4 carbon atoms optionally substituted by halogen, hydroxy, cyano, alkoxy of 1 to 4 carbon atoms, alkoxycarbonyl of 2 to 5 carbon atoms, carboxy, sulfamoyl, sulfo, sulfato or phosphate, and $W^A$ is straight-chain alkylene of 2 to 6 carbon atoms or branched alkylene of 3 to 6 carbon atoms, each of which is interrupted by one or two hetero groups which are selected from the groups of the formulae —O—, —CO—, —$SO_2$—, —NH—, —N($R^A$) with $R^A$ having one of the meanings mentioned in claim 1, —NH—CO—, —CO—NH—, —$SO_2$—NH— and —NH—$SO_2$—, or is phenylene optionally substituted by 1 or 2 substituents selected from the group consisting of sulfo, carboxy, methyl, ethyl, methoxy and ethoxy.

14. A dye as claimed in claim 13, wherein W is a group of the formula (a)

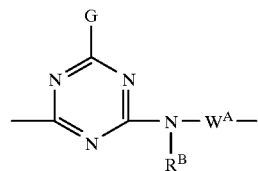

(a)

in which
G is fluorine, chlorine, bromine, cyanoamino, optionally substituted amino, hydroxy, alkoxy of 1 to 4 carbon atoms, phenoxy, phenoxy optionally substituted by 1 or 2 substituents selected from the group consisting of sulfo, carboxy, methyl, ethyl, methoxy and ethoxy, or is alkylthio of 1 to 4 carbon atoms, $R^B$ is hydrogen, or alkyl of 1 to 4 carbon atoms optionally substituted by halogen, hydroxy, cyano, alkoxy of 1 to 4 carbon atoms, alkoxycarbonyl of 2 to 5 carbon atoms, carboxy, sulfamoyl, sulfo, sulfato or phosphate, and $W^A$ is straight-chain alkylene of 2 to 6 carbon atoms or branched alkylene of 3 to 6 carbon atoms, each of which is interrupted by one or two hetero groups which are selected from the groups of the formulae —O—, —CO—, —$SO_2$—, —NH—, —N($R^A$) with $R^A$ having one of the meanings mentioned in claim 1, —NH—CO—, —CO—NH—, —$SO_2$—NH— and —NH—$SO_2$—, or is phenylene optionally substituted by 1 or 2 substituents selected from the group consisting of sulfo, carboxy, methyl, ethyl, methoxy and ethoxy.

15. A process for dyeing a material containing hydroxy or carboxamide groups or both, in which a dye is applied to the material and the dye is fixed to the material by means of heat or with the aid of an alkaline agent or by means of both measures, which comprises employing as a dye a dye as defined in claim 1.

16. A process according to claim 15, wherein the material is a fiber-material.

* * * * *